(12) United States Patent
Gettemy et al.

(10) Patent No.: US 7,362,338 B1
(45) Date of Patent: Apr. 22, 2008

(54) CONTROLLABLE PIXEL BORDER FOR IMPROVED VIEWABILITY OF A DISPLAY DEVICE

(75) Inventors: Shawn Gettemy, San Jose, CA (US); Francis James Canova, Jr., Fremont, CA (US); Roger Flores, Redwood City, CA (US)

(73) Assignee: Palm, Inc., Sunnyvale, CA (US)

( * ) Notice: Subject to any disclaimer, the term of this patent is extended or adjusted under 35 U.S.C. 154(b) by 207 days.

(21) Appl. No.: 09/724,197

(22) Filed: Nov. 27, 2000

Related U.S. Application Data

(63) Continuation-in-part of application No. 09/709,142, filed on Nov. 8, 2000, now Pat. No. 6,961,029.

(51) Int. Cl.
*G09G 5/00* (2006.01)

(52) U.S. Cl. ............... 345/629; 345/581; 345/636; 345/698; 345/55; 345/56; 345/57; 345/58; 345/59; 345/60; 345/61; 345/62; 345/63; 345/64; 345/65; 345/66; 345/67

(58) Field of Classification Search ........... 345/636, 345/629, 698, 55–67, 555, 581, 598
See application file for complete search history.

(56) References Cited

U.S. PATENT DOCUMENTS

| | | |
|---|---|---|
| 4,620,289 A | 10/1986 | Chauvel |
| 4,731,742 A | 3/1988 | Nishi et al. |
| 4,814,756 A | 3/1989 | Chauvel |
| 4,824,212 A | 4/1989 | Taniguchi ............... 350/333 |
| 5,086,295 A | 2/1992 | Boettcher et al. |
| 5,513,028 A | 4/1996 | Sono et al. ............... 359/87 |
| 5,559,529 A | 9/1996 | Maher ............... 345/136 |
| 5,657,043 A | 8/1997 | Fukui et al. ............... 345/100 |

(Continued)

FOREIGN PATENT DOCUMENTS

| | | |
|---|---|---|
| EP | 0283235 A2 | 9/1988 |

(Continued)

*Primary Examiner*—Jin-Cheng Wang

(57) ABSTRACT

A display device having a display matrix (m+2x by n+2x) including an active, e.g., controllable, pixel border located around the edge locations of a frame buffer matrix for improved character viewability. The border can be several pixels wide, e.g., 1<x<5. In one embodiment, the border is two pixels wide and surrounds a liquid crystal display (LCD) matrix area having (m×n) pixels that are controlled by a frame buffer memory. In one embodiment, the pixels of the border are active pixels and each contain a red, a green and a blue subpixel. The pixel border is useful for increasing viewability, e.g., contrast, of characters that are displayed along the edge of the LCD matrix area in a frame buffer region. The invention includes a border attribute register for containing a color attribute and a brightness attribute, in one embodiment. The border attribute register can be set by an operating system command and can be read by a timing generator which generates the appropriate signals for controlling the border pixels. These signals are generated during special periods which otherwise carry invalid data with respect to the frame buffer matrix. In this way, the invention is backward compatible with application programs that use only the frame buffer memory region. Therefore, the active pixel border is advantageous in that it can be used with conventional character generation and display processes and formats. In one embodiment, the novel display can be used within a portable computer system or other portable electronic device.

21 Claims, 24 Drawing Sheets

U.S. PATENT DOCUMENTS

| | | | |
|---|---|---|---|
| 5,719,648 A | 2/1998 | Yoshii et al. | |
| 5,754,186 A * | 5/1998 | Tam et al. | 345/629 |
| 5,784,132 A | 7/1998 | Hashimoto | 349/44 |
| 5,805,149 A * | 9/1998 | Yuki et al. | 345/555 |
| 5,825,343 A * | 10/1998 | Moon | 345/94 |
| 5,838,334 A | 11/1998 | Dye | |
| 5,844,539 A | 12/1998 | Kitagawa | 345/100 |
| 6,018,331 A * | 1/2000 | Ogawa | 345/99 |
| 6,064,359 A | 5/2000 | Lin et al. | 345/89 |
| 6,100,858 A | 8/2000 | Tran | 345/59 |
| 6,140,992 A * | 10/2000 | Matsuzaki et al. | 345/98 |
| 6,181,313 B1 | 1/2001 | Yokota et al. | 345/100 |
| 6,195,078 B1 * | 2/2001 | Dinwiddie et al. | 345/636 |
| 6,204,895 B1 | 3/2001 | Nakamura et al. | 349/5 |
| 6,288,704 B1 | 9/2001 | Flack et al. | 345/158 |
| 6,323,834 B1 | 11/2001 | Colgan et al. | 345/84 |
| 6,323,849 B1 * | 11/2001 | He et al. | 345/204 |
| 6,476,821 B2 * | 11/2002 | Sawada et al. | 345/620 |
| 6,535,188 B1 | 3/2003 | Morimoto | 345/87 |
| 6,577,291 B2 | 6/2003 | Hill et al. | 345/89 |
| 6,590,592 B1 | 7/2003 | Nason et al. | 345/778 |
| 6,597,373 B1 * | 7/2003 | Singla et al. | 345/698 |
| 6,831,662 B1 | 12/2004 | Lum et al. | |
| 6,961,029 B1 * | 11/2005 | Canova, Jr. et al. | 345/55 |

FOREIGN PATENT DOCUMENTS

| | | |
|---|---|---|
| EP | 0394814 A1 | 10/1990 |
| GB | 2214342 A | 8/1989 |

* cited by examiner

312i

= DUMMY PIXEL

314i

= FRAME BUFFER PIXEL

CONTROLLABLE PIXEL BORDER FOR IMPROVED VIEWABILITY OF A DISPLAY DEVICE

This application is a continuation-in-part of and claims the benefit of the copending U.S. patent application entitled "Pixel Border for Improved Viewability of a Display Device" by F. Canova, Jr., et al., filed Nov. 8, 2000, with application Ser. No. 09/709,142, now U.S. Pat. No. 6,961,029.

BACKGROUND OF THE INVENTION

1. Field of the Invention

The present invention relates to the field of display screen technology. More specifically, embodiments of the present invention relate to flat panel display screens that are useful in conjunction with portable electronic devices.

2. Related Art

As the components required to build a computer system have reduced in size, new categories of computer systems have emerged. One of the new categories of computer systems is the "palmtop" computer system. A palmtop computer system is a computer that is small enough to be held in the hand of a user and can therefore be "palm-sized." Most palmtop computer systems are used to implement various Personal Information Management (PIM) applications such as an address book, a daily organizer and electronic notepads, to name a few. Palmtop computers with PIM software have been know as Personal Digital Assistants (PDAs). Many PDAs have a small and flat display screen associated therewith.

In addition to PDAs, small flat display screens have also been implemented within other portable electronic devices, such as cell phones, electronic pagers, remote control devices and other wireless portable devices.

Liquid crystal display (LCD) technology, as well as other flat panel display technologies, have been used to implement many of the small flat display screens used in portable electronic devices. These display screens contain a matrix of pixels, with each pixel containing subpixels for color displays. Some of the displays, e.g., color displays, use a back lighting element for projecting light through an LCD matrix. Other displays, e.g., black and white, use light reflectivity to create images through the LCD matrix and these displays do not need back lighting elements when used in lit surroundings. Whether color or in black and white, because the displays used in portable electronic devices are relatively small in area, every pixel is typically needed and used by the operating system in order to create displays and present information to the user. Additionally, because the display device is typically integrated together with the other elements of the portable electronic device, the operating systems of the portable electronic devices typically expect the display unit to have a standard pixel dimension, e.g., an (m×n) array of pixels.

FIG. 1A illustrates a typical black and white display screen having a standard size pixel matrix 20 with an exemplary edge-displayed character thereon. The edge-displayed character is the letter "A" and is displayed at the left hand side of the display screen at an arbitrary height. The technology could be either transmissive or reflective liquid crystal display (LCD). In the black and white display screen, the background pixels 26 are typically light, e.g., not very dark, and the pixels 24 that make up the edge-displayed character are typically dark. The edge location 28 of the display screen, e.g., between the edge of the matrix 20 and the bezel 22 of the portable electronic device, is typically the same color as the background pixels 26. Therefore, the left edge of the edge-displayed character, "A," has good contrast and is therefore easily viewed by the user. This is the case regardless of the particular edge used, e.g., left, right, up, down, because region 28 surrounds the matrix 20.

FIG. 1B illustrates a typical color display screen having a pixel matrix 20' with the same edge-displayed character thereon. The display screen could be an LCD having thin film transistor (TFT) technology. The edge-displayed character is the letter "A" and is displayed at the left hand side of the display screen at an arbitrary height. In this format, the background pixels 26 are typically light, e.g., because of the back lighting element, and the pixels 24 that make up the edge-displayed character are typically dark. However, importantly, the edge location 28 of the display screen, e.g., between the edge of the color matrix 20' and the bezel 22 of the portable electronic device, is typically dark. Being dark, the edge region 28 is the same or similar color as the pixels 24 that make up the character. Therefore, the left edge of the edge-displayed character, "A," has very poor contrast and is therefore typically lost as illustrated in FIG. 1B. This makes reading the edge displayed character very difficult for a user. This is the case regardless of the particular edge used, e.g., left, right, up, down, because region 28 surrounds the color matrix 20'.

In an attempt to address this problem, some computer systems do not display edge-located characters to avoid the contrast problems associated with the screen edge. Many desktop computer systems, for example, simply try to avoid the display of edge-located characters on the cathode ray tube (CRT) screen or on a large flat panel display. However, this solution is not acceptable in the case of a small display screen where every pixel is needed for image and information presentation. What is needed is a display that makes maximal use of the available screen pixels while eliminating the problems associated with edge displayed characters in any display format where the pixels of the character are of the same or similar color as the edge region 28. What is also needed is a solution that is also compatible with standard display screen dimensions and formats.

SUMMARY OF THE INVENTION

Accordingly, embodiments of the present invention provide an electronic device, e.g., a cell phone, PDA, electronic pager, etc., having a screen that makes maximal use of the available screen pixels while eliminating the problems associated with edge displayed characters. Embodiments provide the above benefits while being backward compatible with standard display screen sizes and formats. Embodiments of the present invention therefore provide a small display screen with improved viewability, especially at the edge locations. The present invention provides these advantages and others not specifically mentioned above but described in the sections to follow.

A display device is described having a display matrix including an active, e.g., controllable, pixel border located around the edge locations of a frame buffer matrix for improved character viewability. The border can be several pixels wide, e.g., 1<x<5. In one embodiment, the border is two pixels wide and surrounds a liquid crystal display (LCD) matrix area having (m×n) pixels that are controlled by a frame buffer memory. The total display therefore contains (m+2x by n+2x) pixels. In one embodiment, the pixels of the border are active pixels and each contain a red, a green and a blue subpixel each having a respective active element. The pixel border is useful for increasing viewability, e.g., contrast, of characters that are displayed along the edge of the LCD matrix area that make up a frame buffer region.

In this embodiment, the display attributes, e.g., color and brightness, of the border pixels can be user controlled. The invention includes a border attribute register for containing a color attribute and a brightness attribute, in one embodiment. The border attribute register can be set by an operating system command and the display attribute is applied to the entire pixel border. If not specified, the border attribute register can, by default, be assigned to the value of the background attribute register. The border attribute register can be read by a timing generator which generates the appropriate signals for controlling the border pixels. The signals for controlling the border pixels are generated during special video timing windows which otherwise carry invalid data with respect to the frame buffer matrix. In this way, the invention is backward compatible with application programs that use only the frame buffer memory region, and therefore do not know about the border. Therefore, the active pixel border is advantageous in that it improves character viewability while still being able to be used in conjunction with conventional character generation and display processes and formats. In one embodiment, the novel display can be used within a portable computer system or other portable electronic device.

As described in more detail below, the present invention takes advantage of certain invalid vertical and horizontal timing windows that are present in conventional video signal formats in order to drive the pixels of the border region. Within these invalid vertical and horizontal timing windows, no frame buffer data is sent. By sending border data during these windows, the present invention is able to render the border pixels without interfering with the conventional rendering processes reserved for the frame buffer region.

More specifically, an embodiment of the present invention includes a display unit comprising: a display panel comprising a pixel matrix comprising: an (m×n) pixel frame buffer region; and an x pixel border region, wherein the border region surrounds the frame buffer region and contains top, bottom, right and left border regions; a frame buffer memory for containing image data for generating an image within the frame buffer region; a border attribute register for containing a display attribute for the border region; and a display controller coupled to the frame buffer memory, coupled to receive the display attribute of the border attribute register, and coupled to control the display panel, the display controller for generating a first set of signals for rendering the image within the frame buffer region wherein the first set of signals comprises vertical and horizontal invalid timing windows and wherein the display controller is also for generating a second set of signals for displaying the display attribute within the border region.

Embodiments include the above and wherein the second set of signals are generated within the vertical and horizontal invalid timing windows and wherein the top and bottom border regions are rendered during the vertical invalid timing windows and wherein the right and left border regions are rendered during the horizontal invalid timing windows.

DETAILED DESCRIPTION OF THE INVENTION

In the following detailed description of the present invention, a display matrix having a controllable pixel border of active pixels for providing contrast improvement for increased viewability of edge-displayed characters, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Exemplary Portable Electronic Device Platform

Figure 1A:
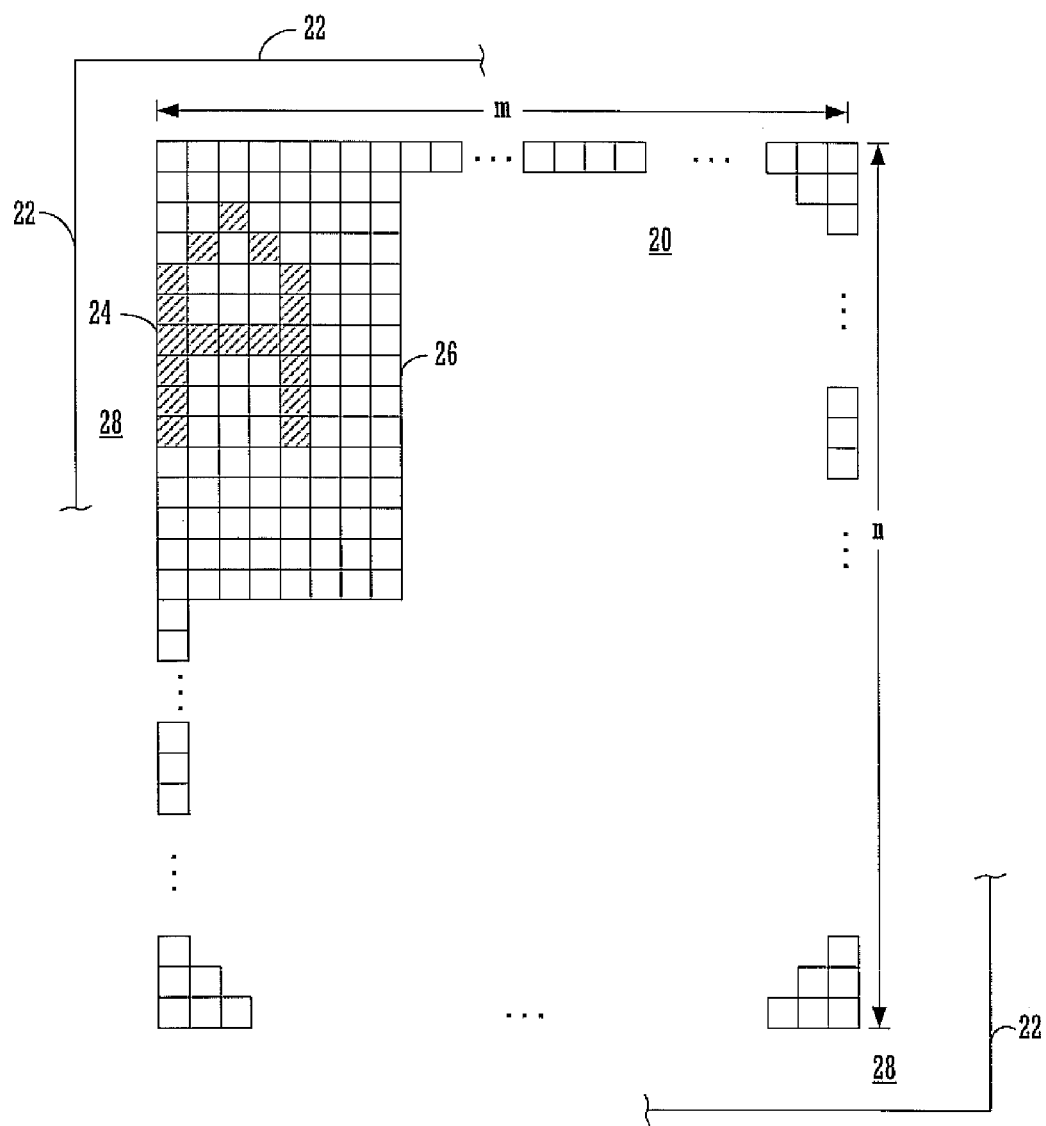
FIG. 1A illustrates a display screen of the prior art having an edge displayed character where the background pixels are light and the character is composed of darker pixels.
Figure 1B:
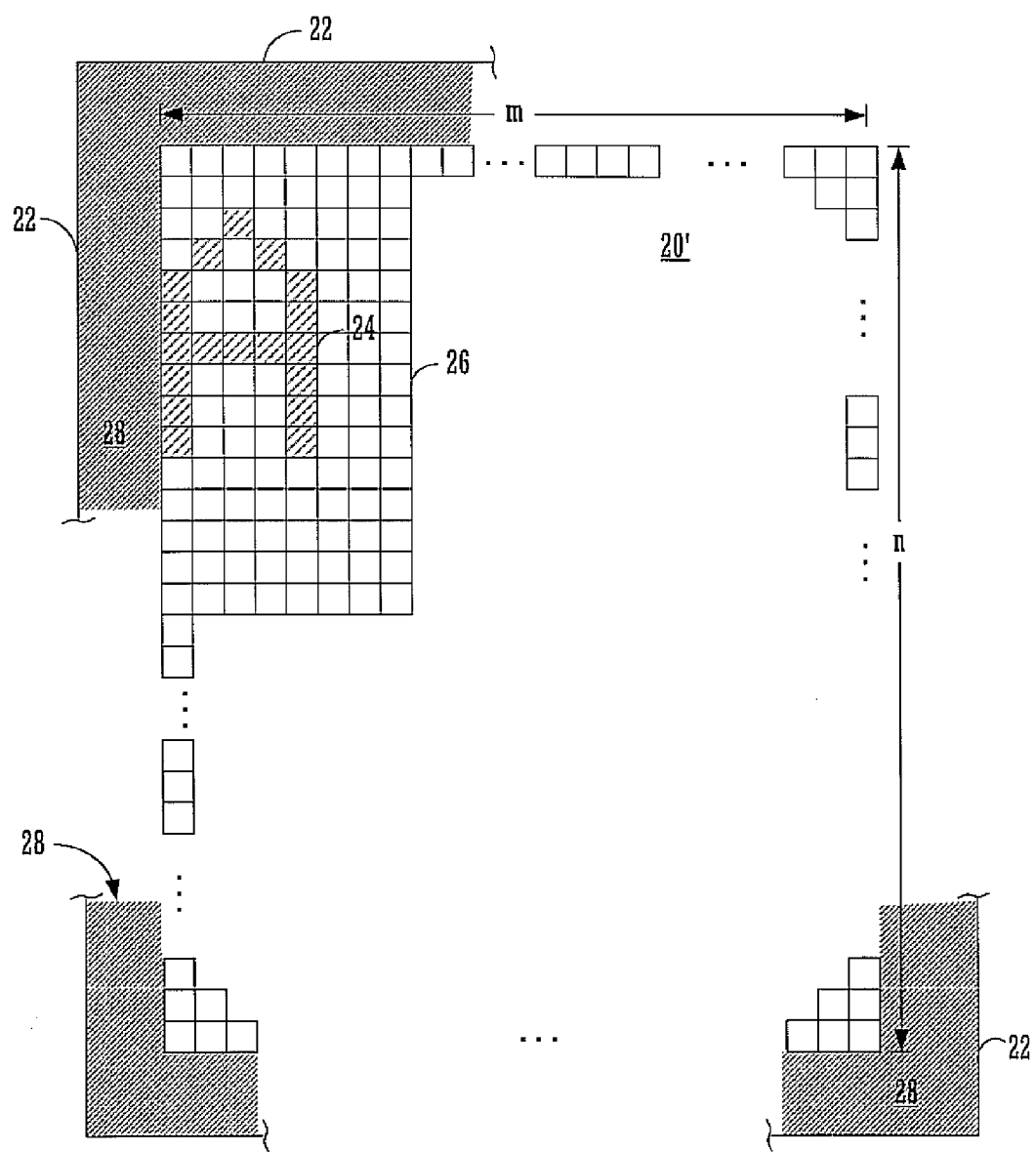
FIG. 1B illustrates a display screen of the prior art having an edge displayed character in a video format where the pixels of the character are of the same or similar color and shade as the edge region of the display panel.
Figure 2A:
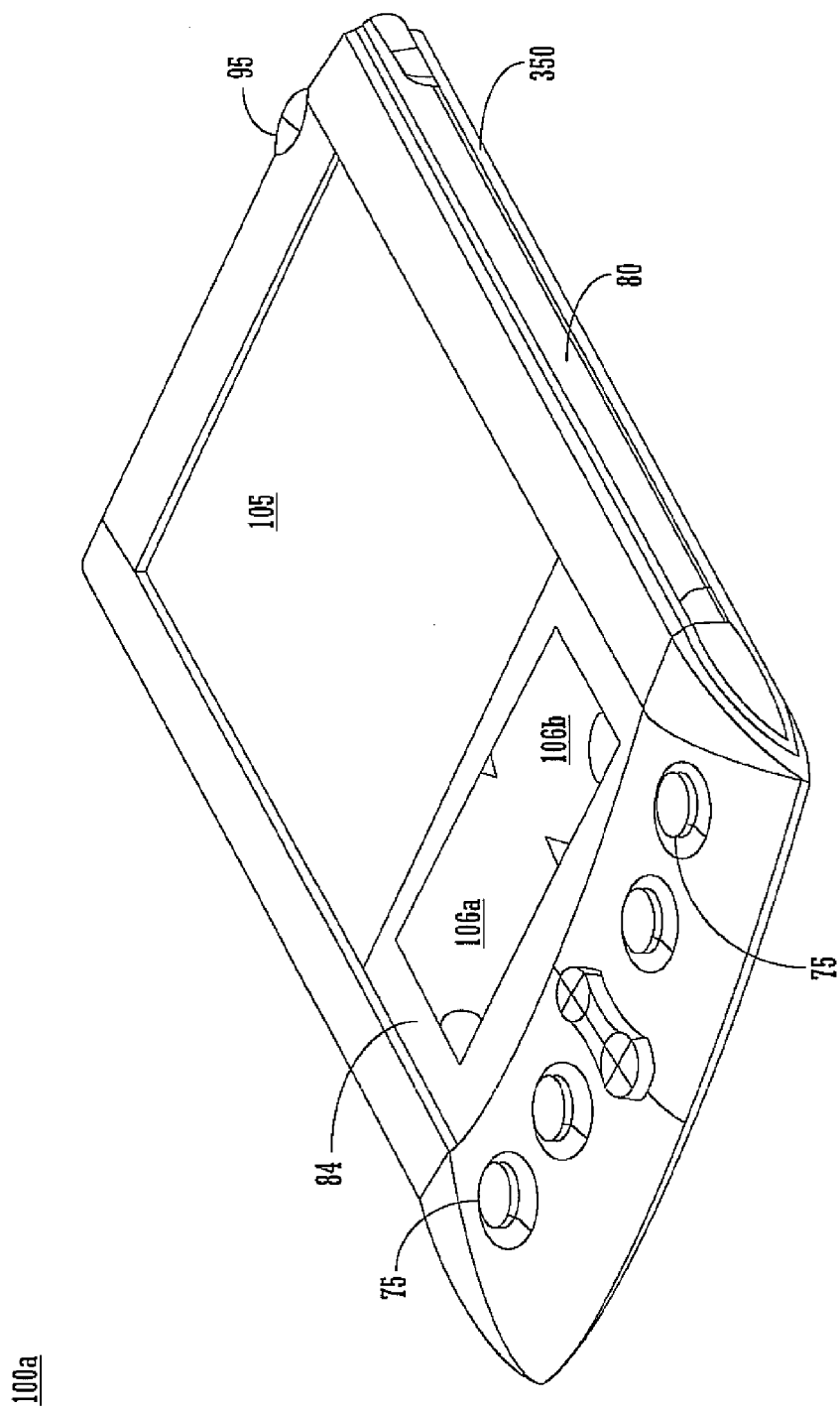
FIG. 2A is a top side perspective view of an exemplary palmtop computer system that can be used in one embodiment of the present invention.

Although the display screen of the present invention can be implemented in a variety of different electronic systems such as a pager, a cell phone, a remote control device, etc., one exemplary embodiment includes the integration of the display screen with a portable electronic device. FIG. 2A is a perspective illustration of the top face 100a of one embodiment of a palmtop computer system that can be used in implementation of the present invention. The top face 110a contains the novel display screen 105 surrounded by a bezel or cover. A removable stylus 80 is also shown. The novel display screen 105 contains a transparent touch screen (digitizer) able to register contact between the screen and the tip of the stylus 80. The novel display screen 105 is described in more detail further below. The stylus 80 can be of any material to make contact with the screen 105. As shown in FIG. 2A, the stylus 80 is inserted into a receiving slot or rail 350. Slot or rail 350 acts to hold the stylus when the computer system 100a is not in use. Slot or rail 350 may contain switching devices for automatically powering down and automatically power up computer system 100a based on the position of the stylus 80. The top face 100a also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106a and 106b. Region 106a is for the drawing of alpha characters therein for automatic recognition (and generally not used for recognizing numeric characters) and region 106b is for the drawing of numeric characters therein for automatic recognition (and generally not used for recognizing numeric characters). The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 5:
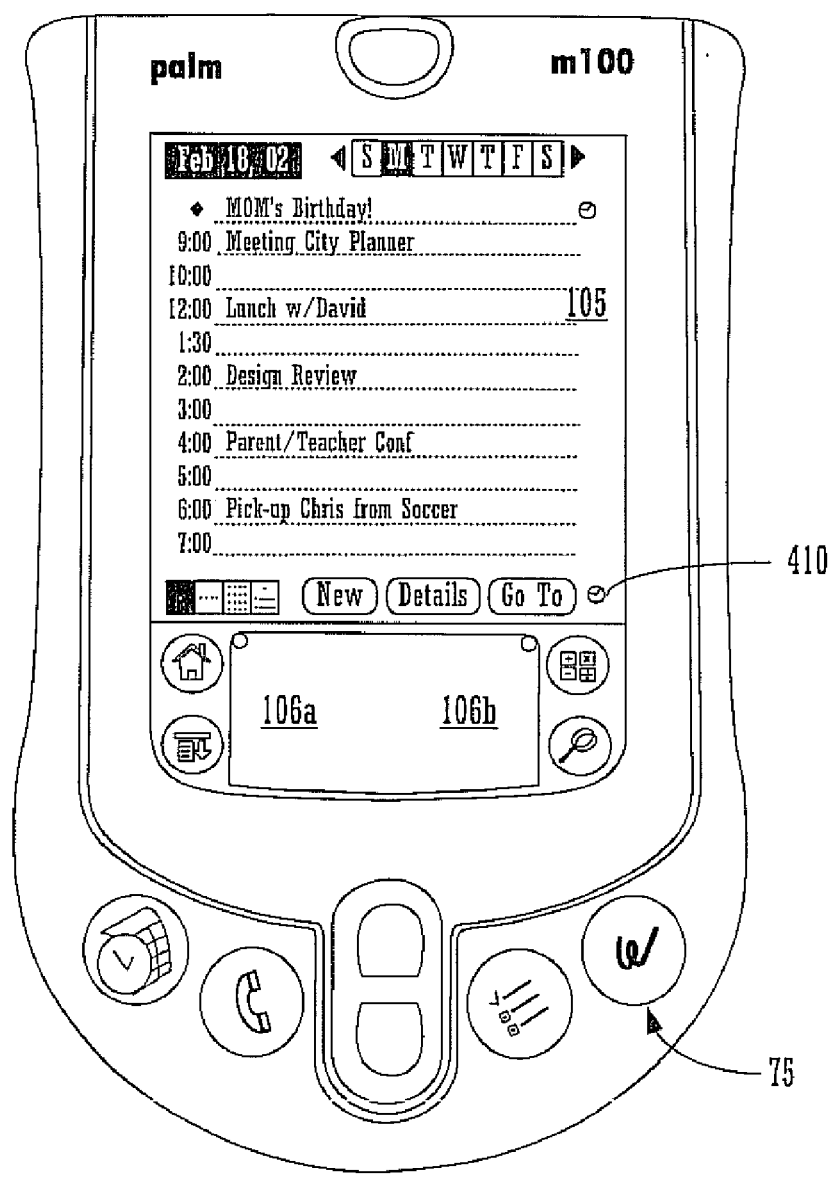
FIG. 5 is a front view of the exemplary computer system that can be used within the display screen of the present invention.

The digitizer 160 records both the (x, y) coordinate value of the current location of the stylus and also simultaneously records the pressure that the stylus exerts on the face of the digitizer pad. The coordinate values (spatial information) and pressure data are then output on separate channels for sampling by the processor 101 (FIG. 5). In one implementation, there are roughly 256 different discrete levels of pressure that can be detected by the digitizer 106. Since the digitizer's channels are sampled serially by the processor, the stroke spatial data are sampled "pseudo" simultaneously with the associated pressure data. The sampled data is then stored in a memory by the processor 101 (FIG. 5) for later analysis.

Figure 2B:
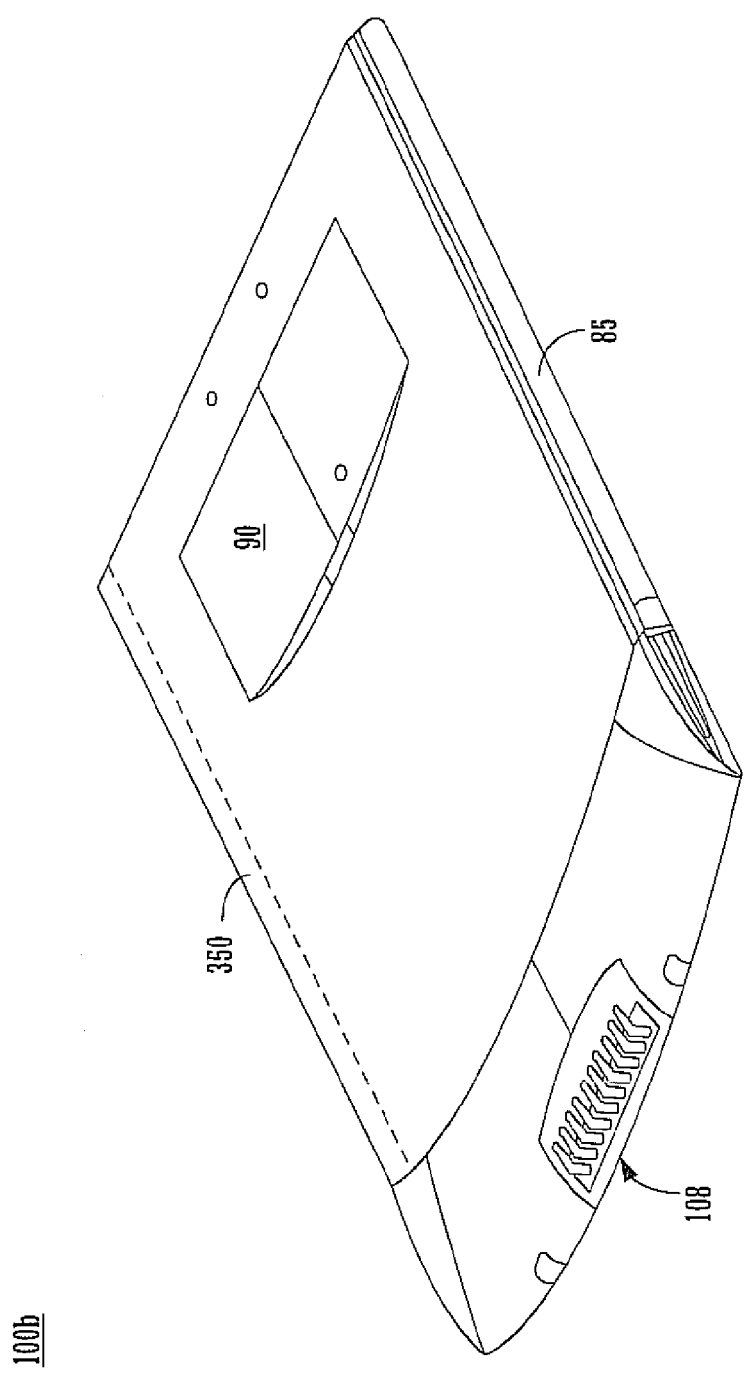
FIG. 2B is a bottom side perspective view of the exemplary palmtop computer system of FIG. 2A.

FIG. 2B illustrates the bottom side 100b of one embodiment of the palmtop computer system. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc. In FIG. 2B is also shown the stylus receiving slot or rail 350.

Figure 2C:
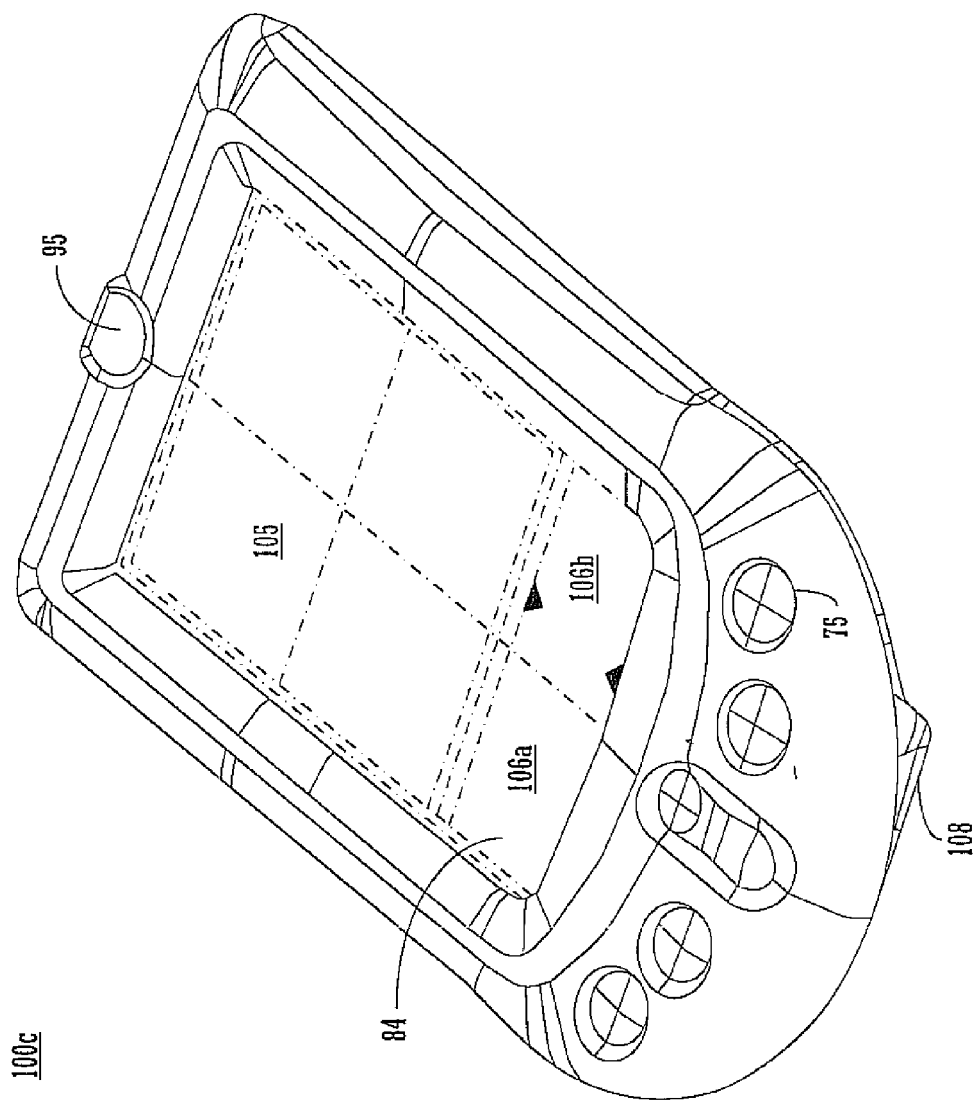
FIG. 2C is another exemplary computer system embodiment

FIG. 2C illustrates a front perspective view of another implementation of the palmtop computer system 100c. As shown, the flat central area is composed of the novel display screen area 105 and a thin silk screen layer material portion 84. Typically, the silk screen layer material portion 84 is opaque and may contain icons, buttons, images, etc., graphically printed thereon in addition to regions 106a and 106b. The novel display screen area 105 and portion 84 are disposed over a digitizer.

Figure 3:
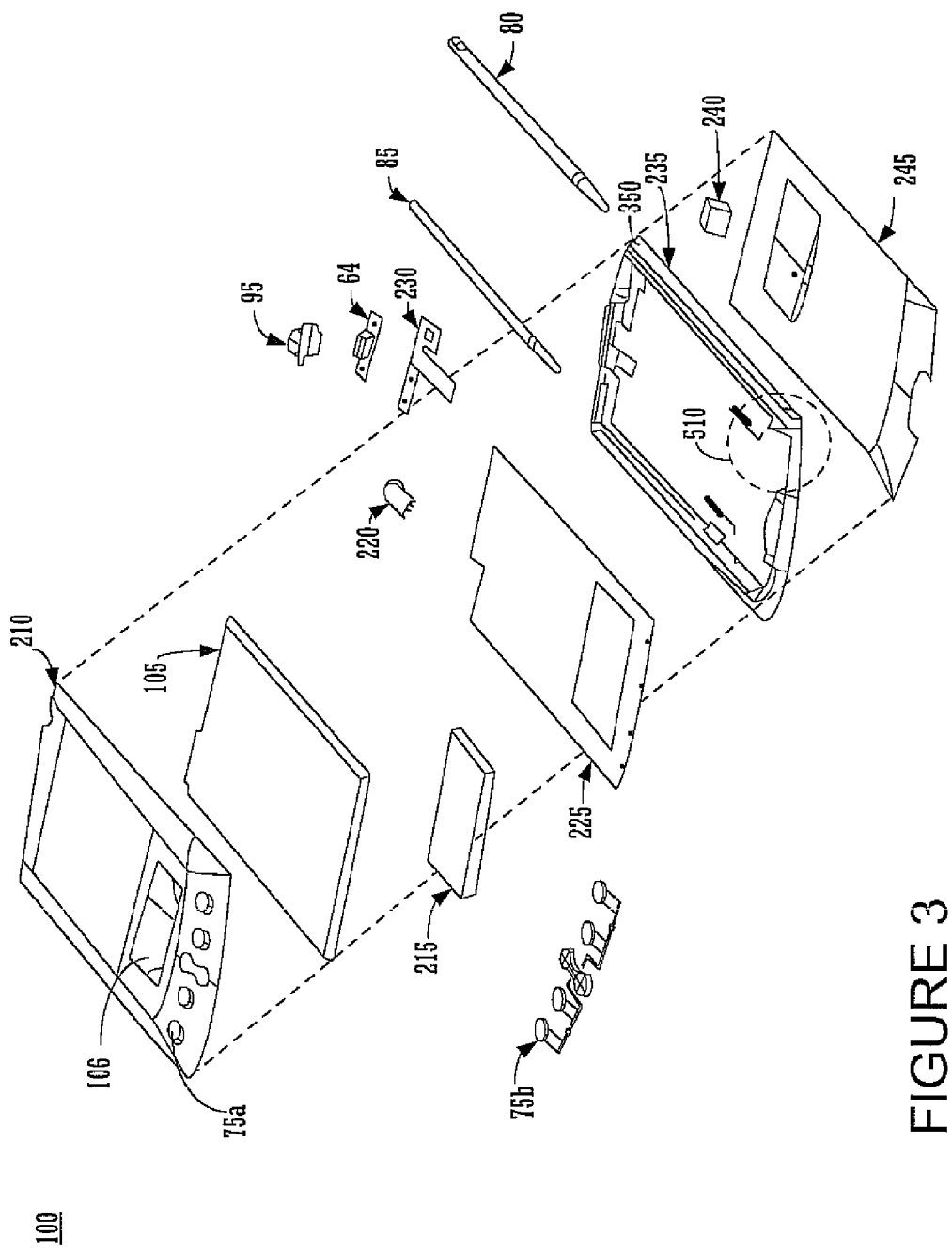
FIG. 3 is an exploded view of the components of the exemplary palmtop computer system of FIG. 2A and FIG. 2C.

FIG. 3 is an exploded view of the exemplary palmtop computer system 100 in accordance with one implementation of the present invention. System 100 contains a front cover 210 having an outline of region 106 and holes 75a for receiving buttons 75b. The novel flat panel display 105 (both liquid crystal display and touch screen in one embodiment) fits into front cover 210. Any of a number of display technologies can be used, e.g., LCD, FED, plasma, organic LED, poly LED, etc., for the flat panel display 105 and having the further details as described below. In one embodiment, the display 105 is a flat panel multi-mode display capable of both monochrome and color display modes.

The touch screen can be a digitizer. A battery 215 provides electrical power. Replaceable cells or rechargeable batteries can be used. Well known electronics coupled to the battery 215 can detect the energy level of the battery 215. This information can be sampled by the computer system 110 (FIG. 5) using well known techniques. The digitizer of FIG. 3 can be implemented using well known devices, for instance, using the ADS-7846 device by Burr-Brown that provides separate channels for spatial stroke information and pressure information. An optional contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Position adjustable antenna 85 is shown. The midframe 235 contains the stylus receiving slot or rail 350.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation, the Mobitex wireless communication system is used to provide two way communication between system 100 and other networked computers and/or the Internet via a proxy server. In other embodiments, TCP protocol can be used.

Figure 4:
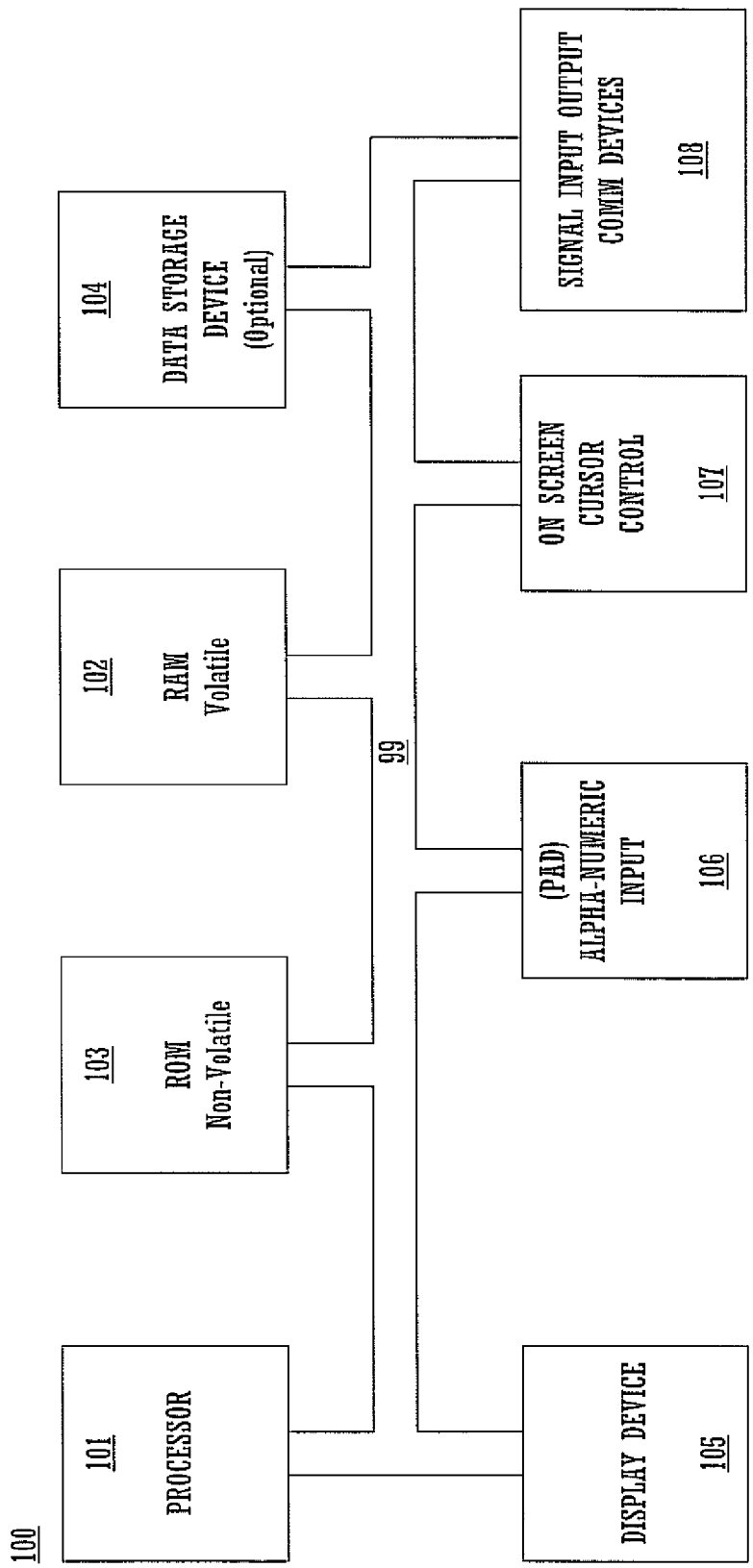
FIG. 4 is a logical block diagram of the exemplary palmtop computer system in accordance with an embodiment of the present invention.

FIG. 4 illustrates circuitry of computer system 100, some of which can be implemented on PC board 225. Computer system 100 includes an address/data bus 99 for communicating information, a central processor 101 coupled with the bus 99 for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 110 also includes an optional data storage device 104 (e.g., memory stick) coupled with the bus 99 for storing information and instructions. Device 104 can be removable. As described above, system 100 also contains the novel display device 105 in accordance with the present invention which is coupled to the bus 99 for displaying information to the computer user. PC board 225 can contain the processor 101, the bus 99, the ROM 103 and the RAM 102.

Also included in computer system 110 of FIG. 4 is an alphanumeric input device 106 which in one implementation is a handwriting recognition pad ("digitizer") having regions 106a and 106b (FIG. 2A), for instance. Device 106 can communicate information (spatial data and pressure data) and command selections to the central processor 101. System 110 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact and the pressure of the contact. The display device 105 utilized with the computer system 110 is described in more detail below and may be a liquid crystal device, LCD, field emission device (FED, also called flat panel CRT), plasma, organic LED, poly LED, etc., or other display device suitable for creating graphic images and alphanumeric characters recognizable to the user.

Signal communication device 108, also coupled to bus 99, can be a serial port for communicating with the cradle 60. Device 108 can also include an infrared communication port.

FIG. 5 is a front view of the exemplary palmtop computer system 100 having an exemplary display within screen 105. The exemplary display contains one or more graphical user interface elements including a menu bar and selectable on-screen buttons 410. Buttons on screen 105 can be selected by the user directly tapping on the screen location of the button with stylus 80 as is well known. Also shown are two regions of digitizer 106a and 106b. Region 106a is for receiving user stroke data (and pressure data) for alphabet characters, and typically not numeric characters, and region 106b is for receiving user stroke data (and pressure data) for numeric data, and typically not for alphabetic characters. Physical buttons 75 are also shown. Although different regions are shown for alphabetic and numeric characters, the device is also operable within a single region that recognizes both alphabetic and numeric characters.

It is appreciated that, in one embodiment, the digitizer region 106a and 106b are separate from the display screen 105 and therefore does not consume any display area.

Figure 6A:
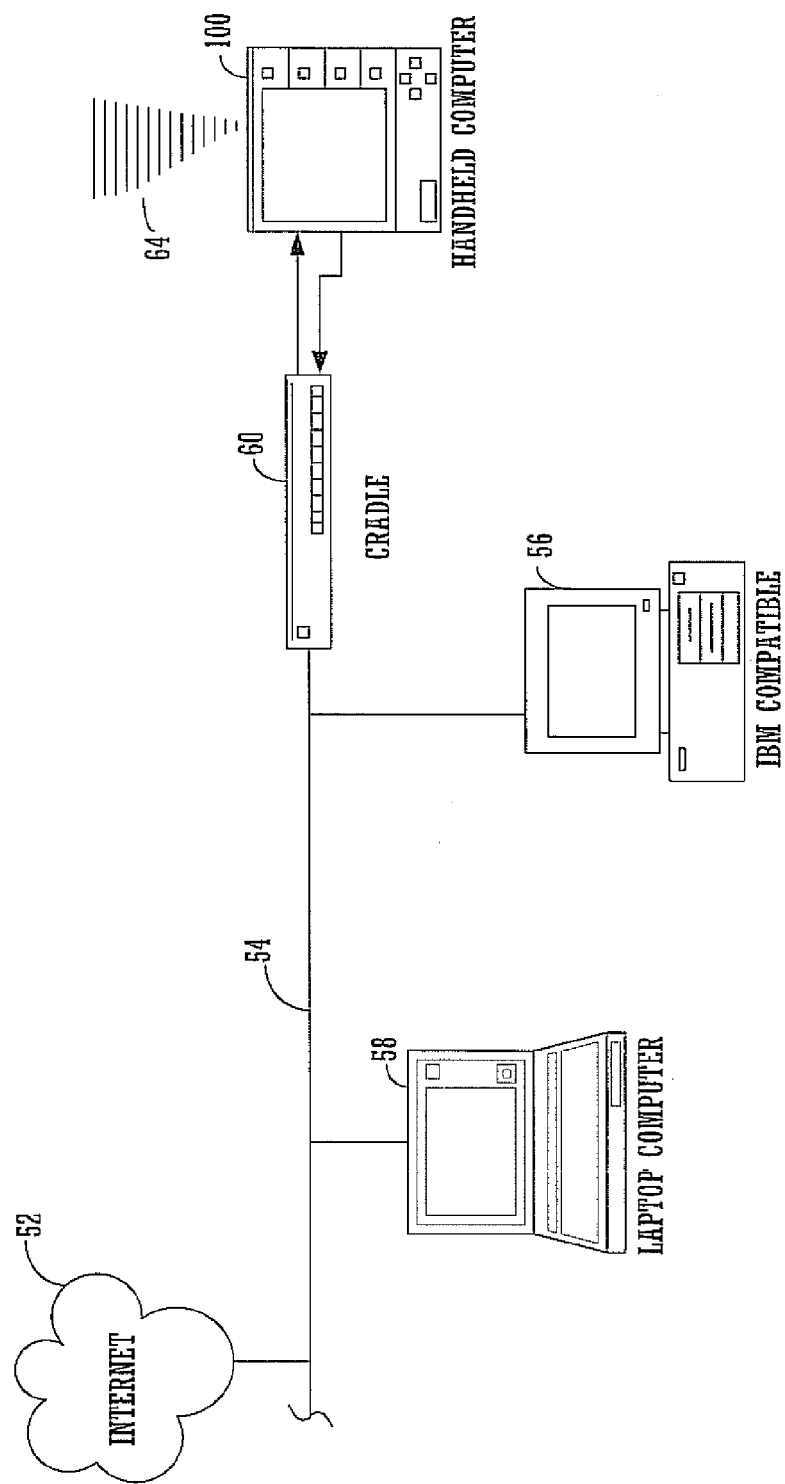
FIG. 6A is an exemplary communication network in which the exemplary palmtop computer can be used.

FIG. 6A illustrates a communication system 50 that can be used in conjunction with the palmtop computer system 100. System 50 is exemplary and comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Importantly, bus 54 is also coupled to a cradle 60 for receiving and initiating communication with a palm top ("palm-sized") portable computer system 100 of the present invention. Cradle 60 provides an electrical and mechanical communication interface between bus 54 (and anything coupled to bus 54) and the computer system 100 for two way communications. Computer system 100 also contains a wireless infrared communication mechanism 64 for sending and receiving information from other devices.

Figure 6B:
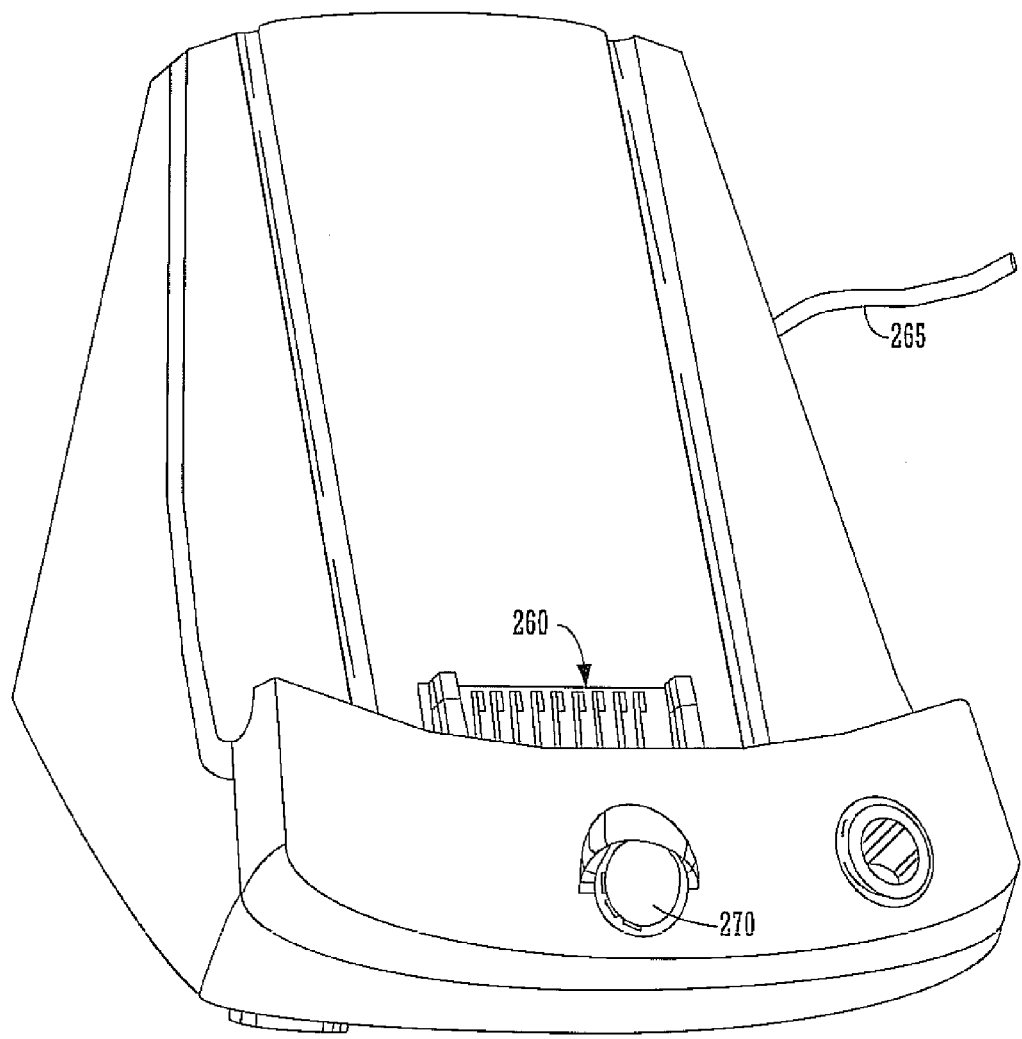
FIG. 6B is a perspective view of a cradle device for connecting the exemplary palmtop computer system to other systems via a communication interface.

FIG. 6B is a perspective illustration of one embodiment of the cradle 60 for receiving the palmtop computer system 100. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication 265.

Dummy Pixel Border Embodiment

Figure 7:
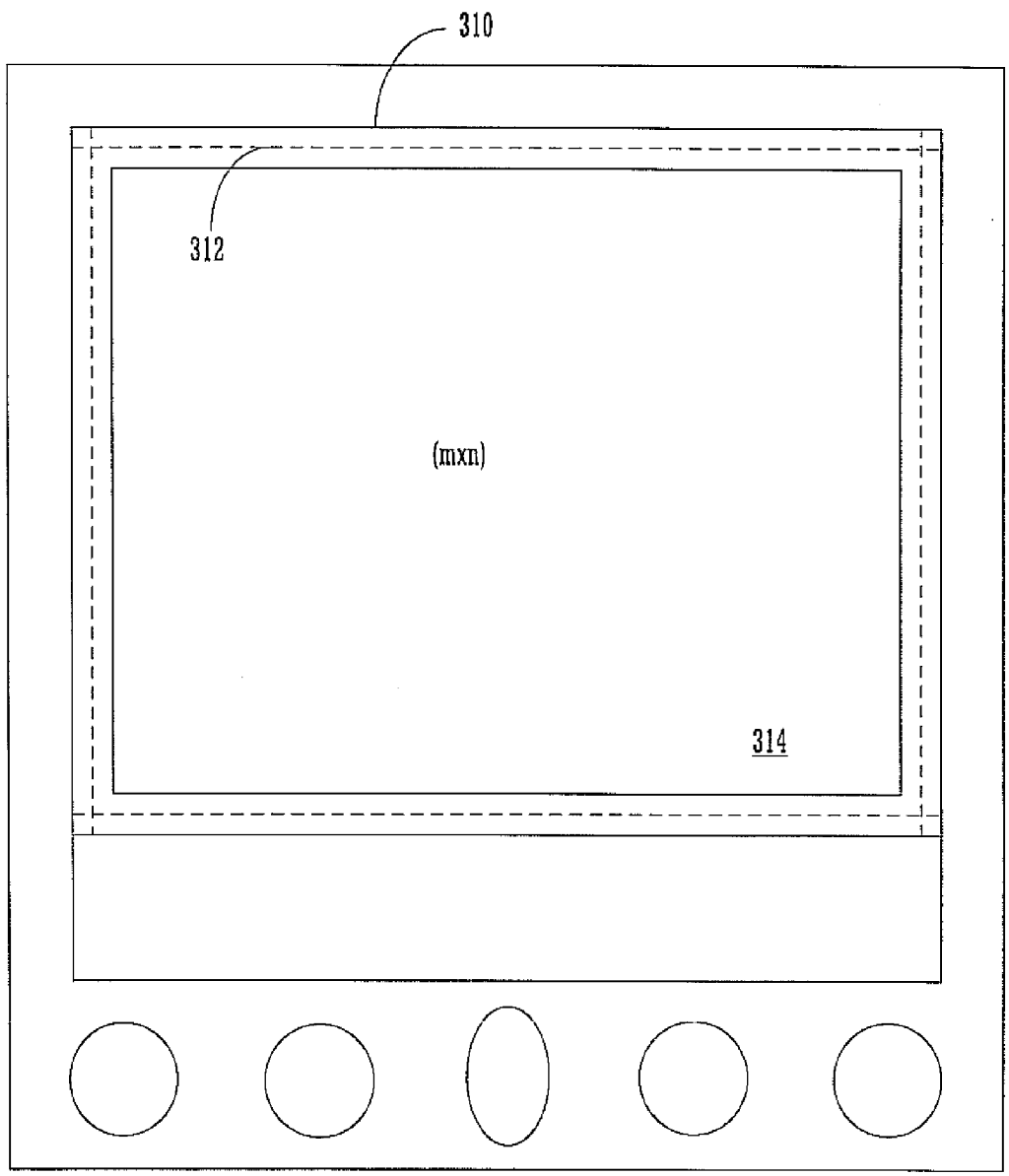
FIG. 7 illustrates a display screen in accordance with one embodiment of the present invention including a border pixel region and a frame buffer pixel region.

FIG. 7 illustrates a front view of the display screen in accordance with an embodiment of the present invention. The display screen contains two different display regions. Region 314 is the frame buffer pixel region and contains a matrix of pixels oriented in m rows and n columns according to a variety of display dimensions and formats. Region 314 generates an image that is a representation of data stored in a frame buffer memory (also called video memory) of computer system 100. Although region 314 can have any dimensions, in one embodiment it includes the dimensions of 160 pixels by 160 pixels. The computer system, e.g., the operating system, controls the information that is stored into the frame buffer memory and thereby controls the pixels of region 314.

Surrounding region 314 of FIG. 7 is a novel pixel border region 312 in accordance with the present invention and having a predetermined pixel width, x. The pixels of the pixel border region 312 are called "dummy" pixels because they do not have a controllable element therein. Although the width is arbitrary, in one embodiment the width is two pixels. The pixel border region 312 of the present invention is not controlled by the frame buffer memory and is useful for giving contrast improvement for the viewability of edge located characters. In this respect, the pixels of the pixel border 312 are generally displayed white to match the background pixel color. Specifically, the pixel border 312 is useful for giving contrast improvement for characters displayed along the edges, e.g., upper, lower, right and left, of region 314. The total viewing area (in pixels) of the display screen when x=2 is therefore m+4 rows and n+4 columns.

Figure 8:
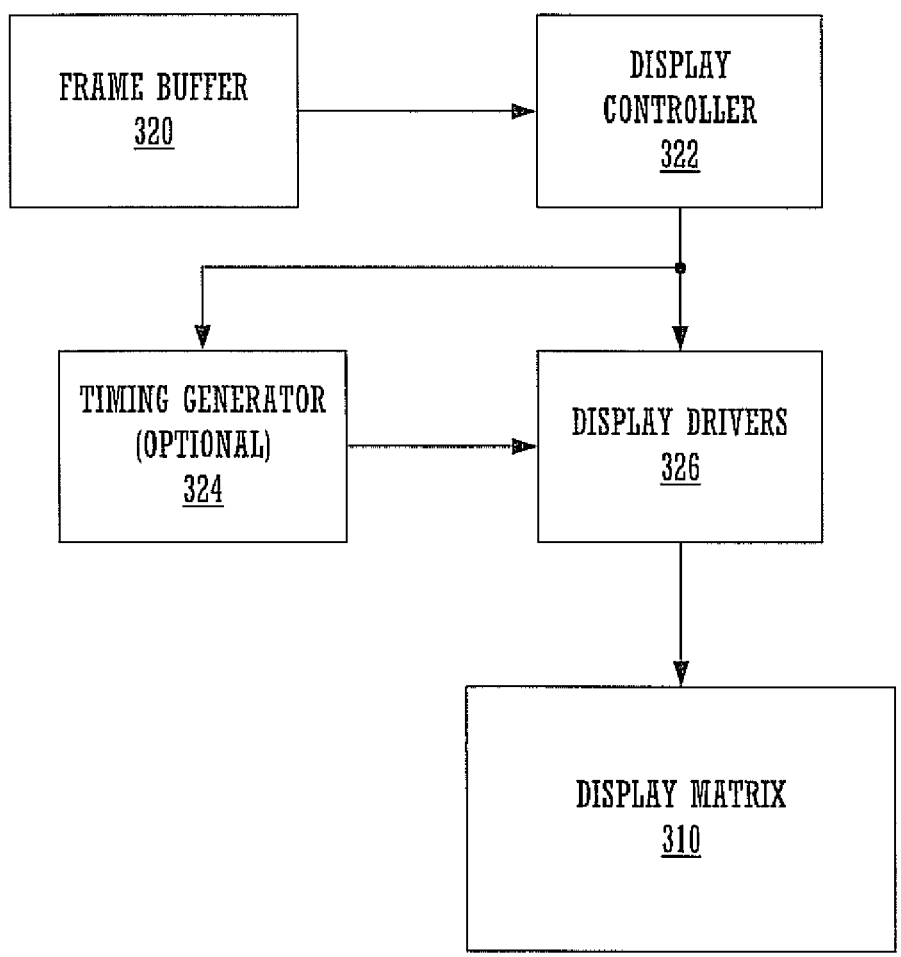
FIG. 8 is a block diagram of the display unit in accordance with one embodiment of the present invention.

FIG. 8 illustrates a logical diagram of the components of the novel display unit 105 in accordance with an embodiment of the present invention. Frame buffer memory 320 contains a bitmapped image for display. This frame buffer is read, periodically, by a display controller 322. The display controller 322 is well known. Display controller 322 is either coupled directly to a display driver 326 or to a timing generator 324. Controller 322 generates well known timing signals, such as vertical and horizontal synchronization signals, as well as clocking signals; all required to properly propagate image data into the display drivers 326. The timing generator 324 is sometimes needed to convert the signals from the controller according to the requirements of the drivers. The display drivers 326 are coupled to active transistors within the display matrix 310. The display matrix 310 generates images by the modulation of light by discrete pixel elements. The display matrix 310 can be of liquid crystal display (LCD) technology but could also be of any active display technology, such as field emission display (FED) technology or other flat panel display technologies. Although display matrix 310 is coupled to display drivers 326, it is appreciated that region 312 is not coupled to display drivers because it contains no active elements.

Figure 9A:
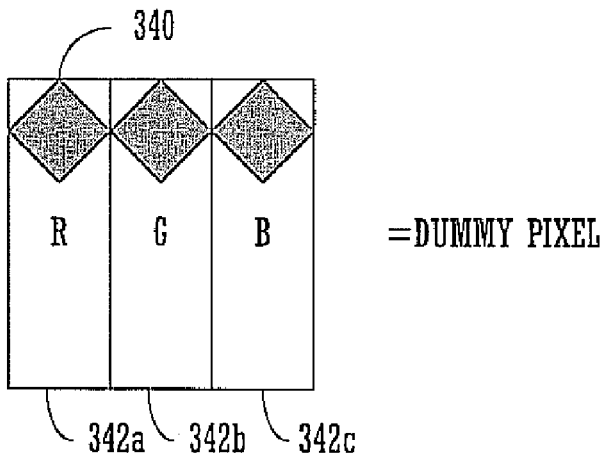
FIG. 9A is a diagram of a dummy pixel of the border pixel region in accordance with an embodiment of the present invention.

FIG. 9A illustrates an example dummy pixel 312$i$ of the pixel border region 312 of the present invention. In one embodiment, the display matrix 310 is an LCD device constructed using thin film transistor (TFT) technology. The dummy pixel is like a conventional pixel of the frame buffer pixel region 314 except the dummy pixel 312$i$ does not contain an active element, as indicated by the darkened diamond 340. The active element can be any number of display elements, including a transistor, a series of diodes or a single diode. Therefore, the dummy pixels are not controlled by the frame buffer memory and are not coupled electrically to the display driver circuits 326 (FIG. 8). In one embodiment, the display is a color display and therefore the dummy pixel 312$i$ is comprised of three sub-dummy-pixels including a red sub-dummy-pixel 342$a$, a green sub-dummy-pixel 342$b$ and a blue sub-dummy-pixel 342$c$. Each sub-dummy-pixel 342$a$–342$c$ contains a respective color filter. It is appreciated that by not containing an active transistor therein, each of the sub-dummy-pixels 342$a$–342$c$ of the dummy pixel 312$i$ remain fixed and open thereby allowing light to pass there through creating a white image for the dummy pixel 3121. Each sub-dummy-pixel contains a respective color filter.

Figure 9B:
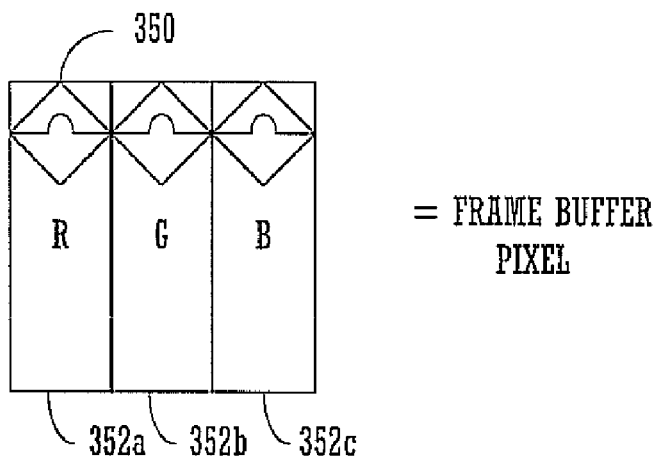
FIG. 9B is a diagram of an active pixel of the frame buffer pixel region in accordance with an embodiment of the present invention.

FIG. 9B illustrates a pixel 314$i$ of the frame buffer pixel region 314. In one embodiment, the display is color and therefore pixel 314$i$ contains a red subpixel 352$a$, a green subpixel 352$b$ and a blue subpixel 352$c$. Each subpixel contains a respective active element 350, e.g., transistor, that is controlled by the frame buffer memory, e.g., each transistor 350 is coupled to the display driver circuits 326 (FIG. 8). Like the sub-dummy-pixels 342, each subpixel 352 also contains a respective color filter.

Figure 10:
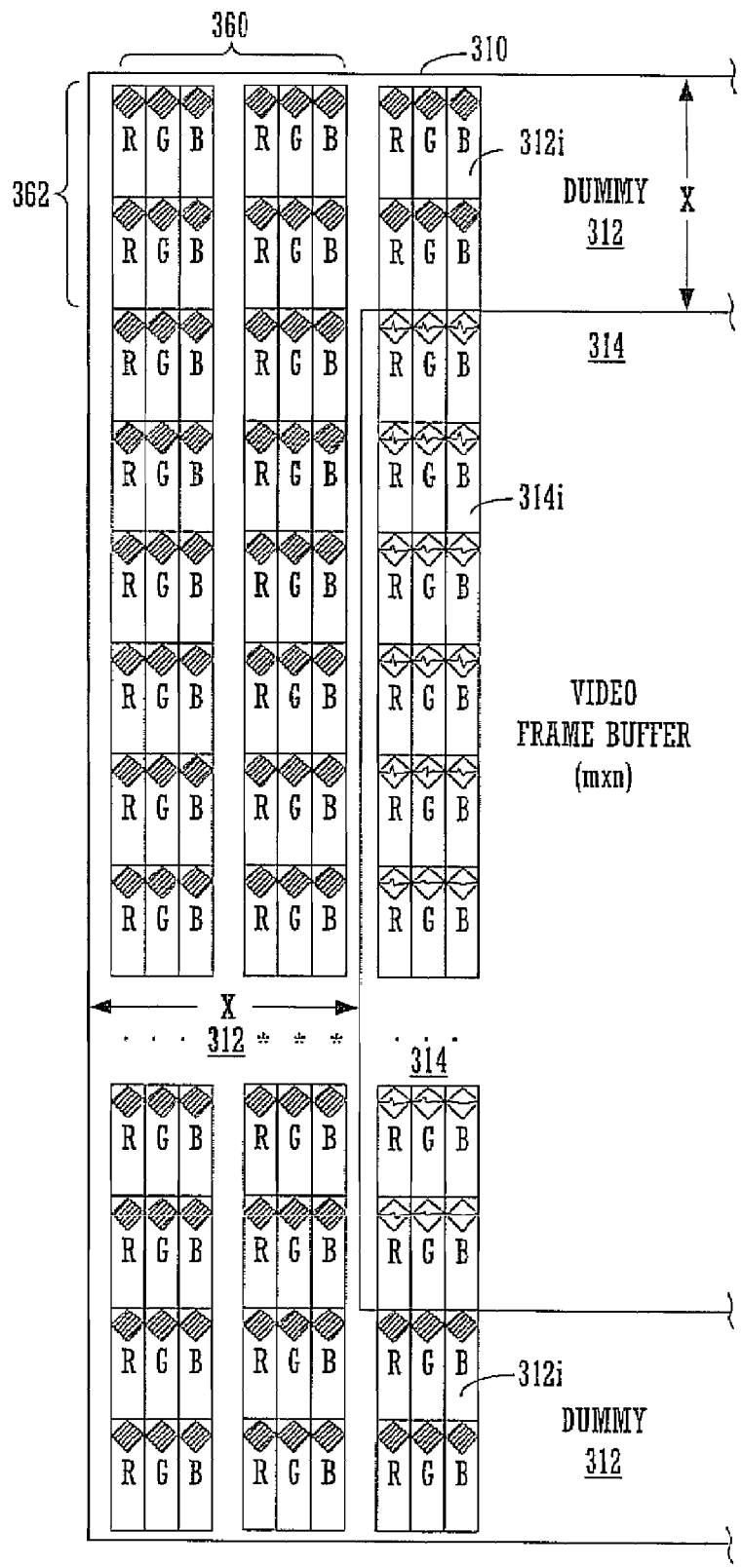
FIG. 10 illustrates the pixel architecture of the display matrix of one embodiment of the present invention including the border pixel region and the frame buffer pixel region.

FIG. 10 illustrates an exemplary pixel architecture of the display matrix 310 in accordance with an embodiment of the present invention where x=2 and the display is color. In this embodiment, the left hand side of the pixel border 312 is shown partially with the upper and lower corners displayed. As shown in FIG. 9A, dummy transistors are darkened. Two columns of dummy pixels are shown 360 along the left side edge. On the top edge, two rows of dummy pixels 362 are also shown and also on the bottom. The dummy pixels 312$i$ of the border region 312 surround the frame buffer display region 314, which contains an array of m rows and h columns of pixels, some of which are shown as 314$i$. In one embodiment, there are 160×160 pixels in region 314 and the width of region 312 is two. In this case, the LCD glass has a color filter pattern of 164×164 pixels which allow light through from a back light element (FIG. 11). The LCD glass has transistors placed on only the interior 160×160 pixels (region 314) which are addressed by the frame buffer memory. In this case, the pixel border 312 remains lit all the time thereby providing a white border.

Figure 11A:
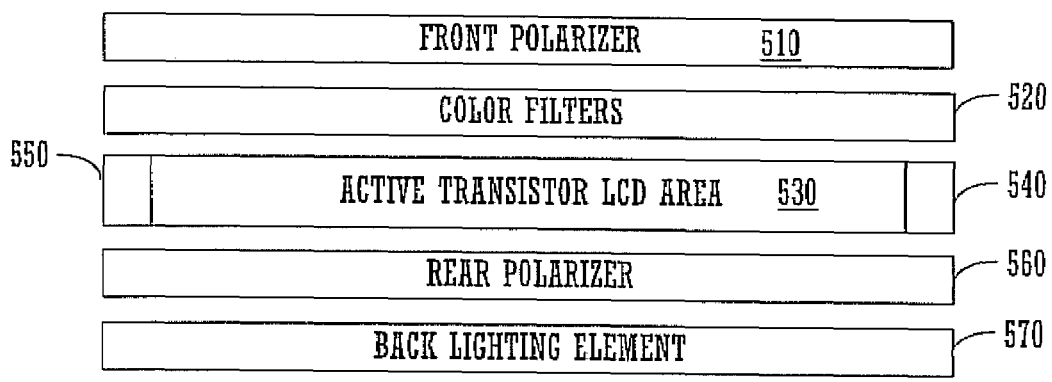
FIG. 11A is a cross sectional view of the display matrix including a cross sectional view of the pixel border in accordance with an embodiment of the present invention.

FIG. 11A illustrates a cross section of the display matrix 310 in accordance with one embodiment of the present invention. The embodiments of the present invention can be applied to transmissive, transreflective and reflective display technologies. In this embodiment, a backlighting element 570, e.g., a cold cathode fluorescent (CCF) tube or other lighting device, is illustrated adjacent to a rear polarizer layer 560. An active transistor LCD layer 530 is also shown. The active transistor layer 530 maps to region 314 and may control m rows and n columns of pixels. Region 540 and region 550 correspond to the dummy pixel border 312 and therefore do not contain any transistors thereby always allowing light to pass there through. A color filter pattern 520 is also shown. The color filter pattern 520 is a matrix of (m+2x) by (n+2x) pixels. After the color filter pattern 520, a front polarizer layer 510 is provided.

Figure 11B:
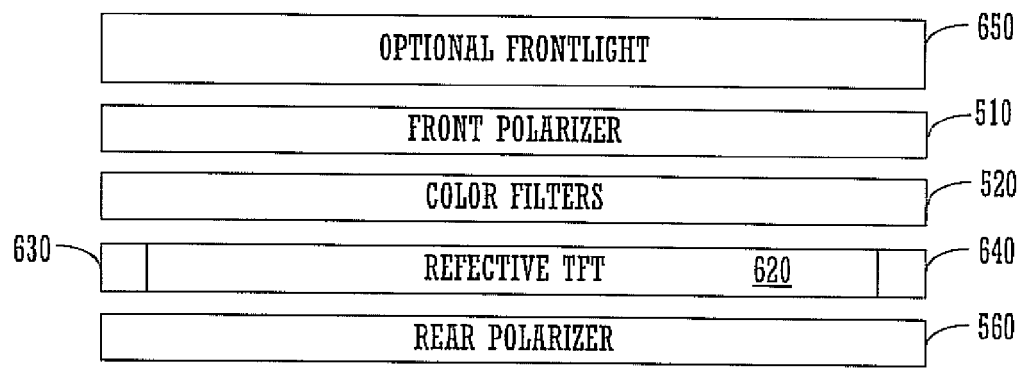
FIG. 11B is a cross sectional view of a reflective display matrix including a cross sectional view of the pixel border in accordance with an embodiment of the present invention.

FIG. 11B illustrates a cross section of a reflective display matrix 610 in accordance with one embodiment of the present invention. In this embodiment, a reflective thin film transistor layer 620 is used. Layer 620 maps to region 314 and may control m rows and n columns of pixels. Region 640 and region 630 correspond to the dummy pixel border 312 and therefore do not contain any transistors thereby always allowing light to pass there through. An optional frontlight layer 650 can be used and a front polarizer 510 is shown along with a rear polarizer 560. The color filter pattern 520 is a matrix of (m+2x) by (n+2x) pixels.

Figure 12:
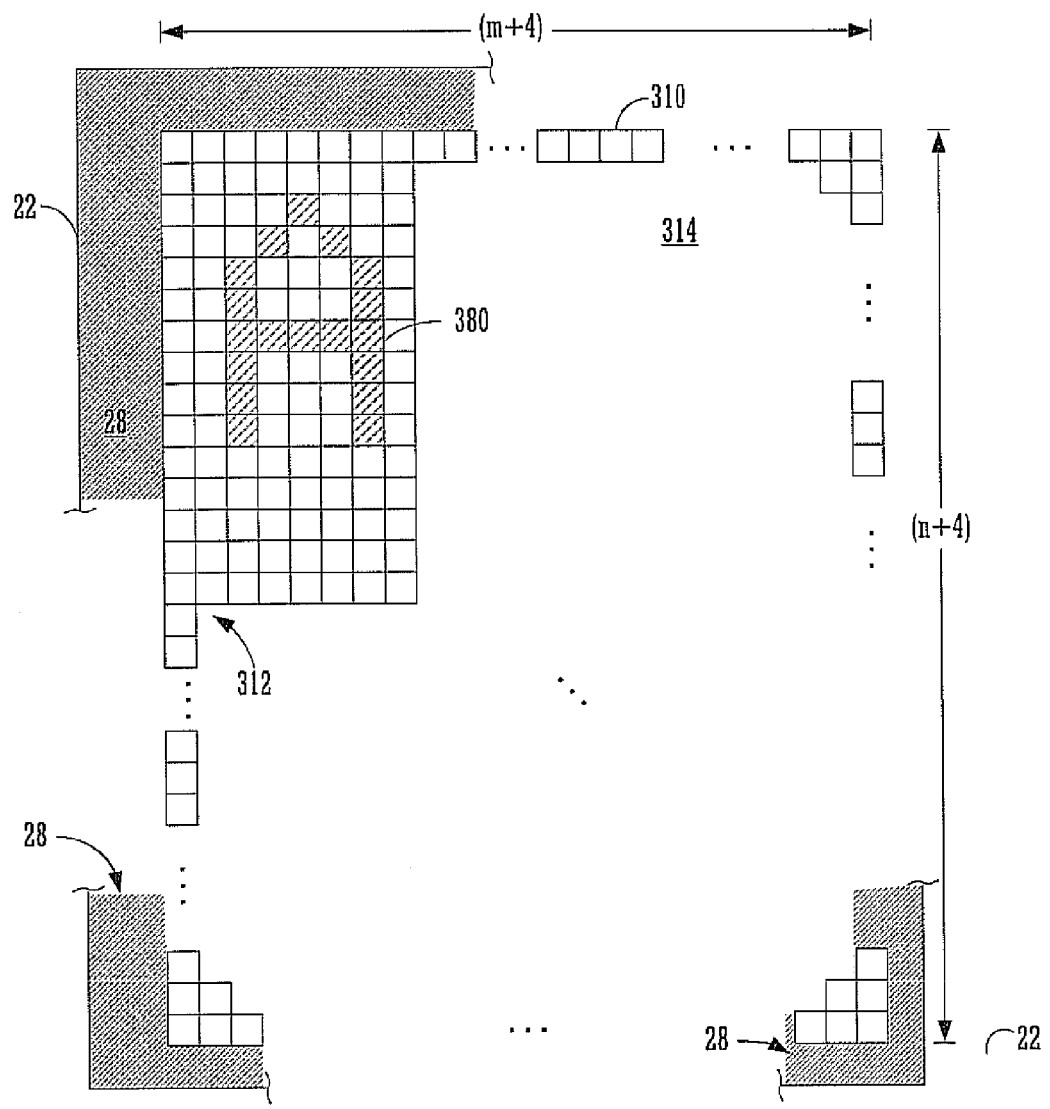
FIG. 12 is an exemplary display using the display unit with pixel border in accordance with one embodiment of the present invention and having an edge displayed character in a video format in which the character pixels are of the same or similar color as the edge of the display panel.

FIG. 12 illustrates a resultant display in accordance with the present invention using a pixel border of width =2. The pixels 380 of the edge displayed character, "A," are dark and the background pixels are white in this case, e.g., one exemplary form of a reverse video display format. The edge region 28 of the display panel is dark, e.g., the same or similar color as the pixels 380 of the character. In this exemplary case, the border pixels 312 of the present invention are also white. The total number of pixels in the display 310 are (m+2x) by (n+2x). By providing a white border region 312, the contrast along the left edge of the character, "A," is much improved thereby improving viewability of the character. This advantageous result is achieved without any requirement of changing the operating system of the computer because the standard (m×n) pixel region 314 of the display remains unchanged. Furthermore, because the border pixels (dummy pixels) of region 312 are not driven by driver circuitry, standard (m×n) driver circuits and software can be used with the present invention.

Controllable Pixel Border Embodiment

In addition to the dummy pixel embodiment, described above, embodiments of the present invention include a pixel border region having active elements that can be controlled by the computer system thereby giving rise to a "controllable" pixel border. The active elements can be controlled to display a particular display attribute, e.g., color and intensity, that may be found within a border attribute register maintained, for instance, by the operating system. Although the pixel border is controllable, it nevertheless remains backward compatible with conventional display processes and formats.

Figure 13:
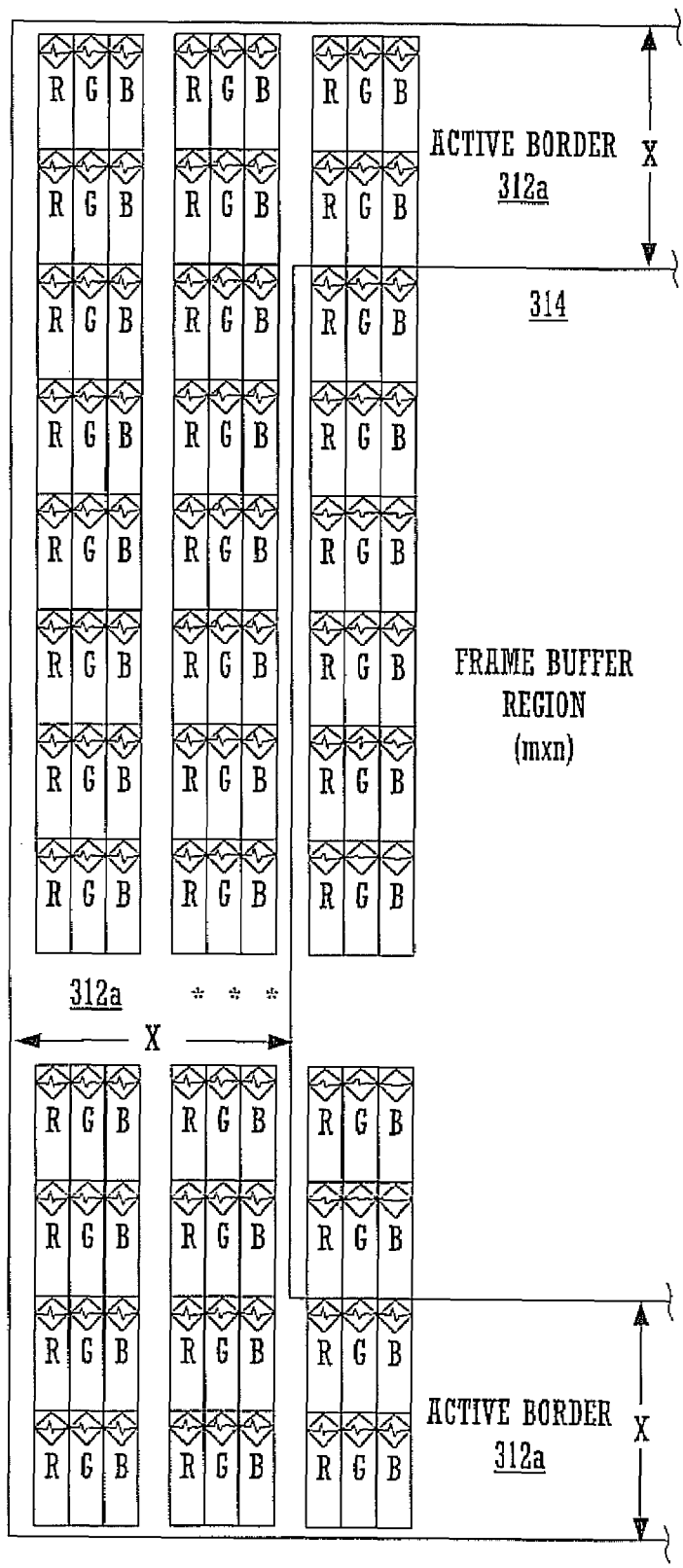
FIG. 13 illustrates the pixel architecture of the display matrix of one embodiment of the present invention including a controllable border pixel region and the frame buffer pixel region.

FIG. 13 illustrates the left portion of the pixel architecture of the controllable pixel border region 312$a$ in accordance with this embodiment of the present invention. In this embodiment, the individual sub-pixels of the border region 312$a$ each contain an active element, e.g., a transistor, and are therefore analogous of the sub-pixels of the frame buffer region 314. As shown, the pixel border region 312a is x pixels wide (e.g., 2 pixels) and surrounds the (m×n) pixel frame buffer region 314. Because the pixels of the border region 312a contain active elements, they are connected to, and are controlled by, the display driver circuitry (FIG. 15), as discussed further below.

Figure 14:
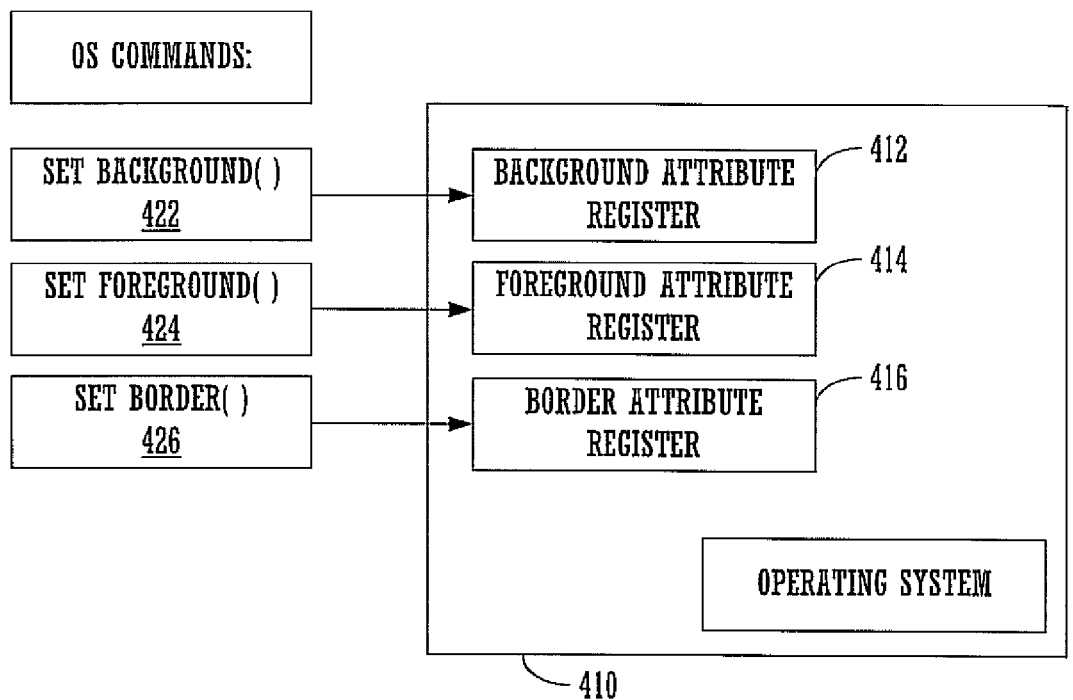
FIG. 14 is a logical block diagram of the background, foreground and border attribute registers which can be used in the controllable border pixel embodiment of the present invention.

FIG. 14 illustrates some of the display registers that the operating system can program in order to place the display 105 into particular display formats including the pixel border region. The background attribute register 412, is controlled by an operating system set command 422, and controls the color and intensity of the background pixels. The foreground attribute register 414, is controlled by an operating system set command 424, and controls the color and intensity of the foreground pixels, e.g., the pixels that make up the displayed characters. It is appreciated that foreground register 414 and background register 412 can apply to various display elements that are under operating system control with respect to display attributes. For instance, the display of text or the display of the menu bar elements may have its own respective pair of registers to control background and foreground. Therefore, registers 414 and 412 are exemplary of these possible choices. The border attribute register 416, is controlled by an operating system set command 426, and controls the color and intensity of the pixels of the border region 312a in accordance with the present invention.

Application programs can invoke the set commands 422–426 to alter the display format in any of a number of different ways. In one embodiment, if the border attribute register 416 is not set by an application program, then the operating system 410 will set, by default, the border attribute register 416 to be equal to the background attribute register 412. This makes for a uniform display attribute across the display screen, e.g., blending the border, while giving good contrast to any edge displayed characters of the foreground display attribute. It is appreciated that while various images can be rendered in the frame buffer region 314, the border region 312a can only be programmed to have a single display attribute at a time, and that single display attribute is applied across all pixels of the border region 312a. However, the single display attribute changes each time a new value is loaded into the border attribute register 416.

Figure 15:
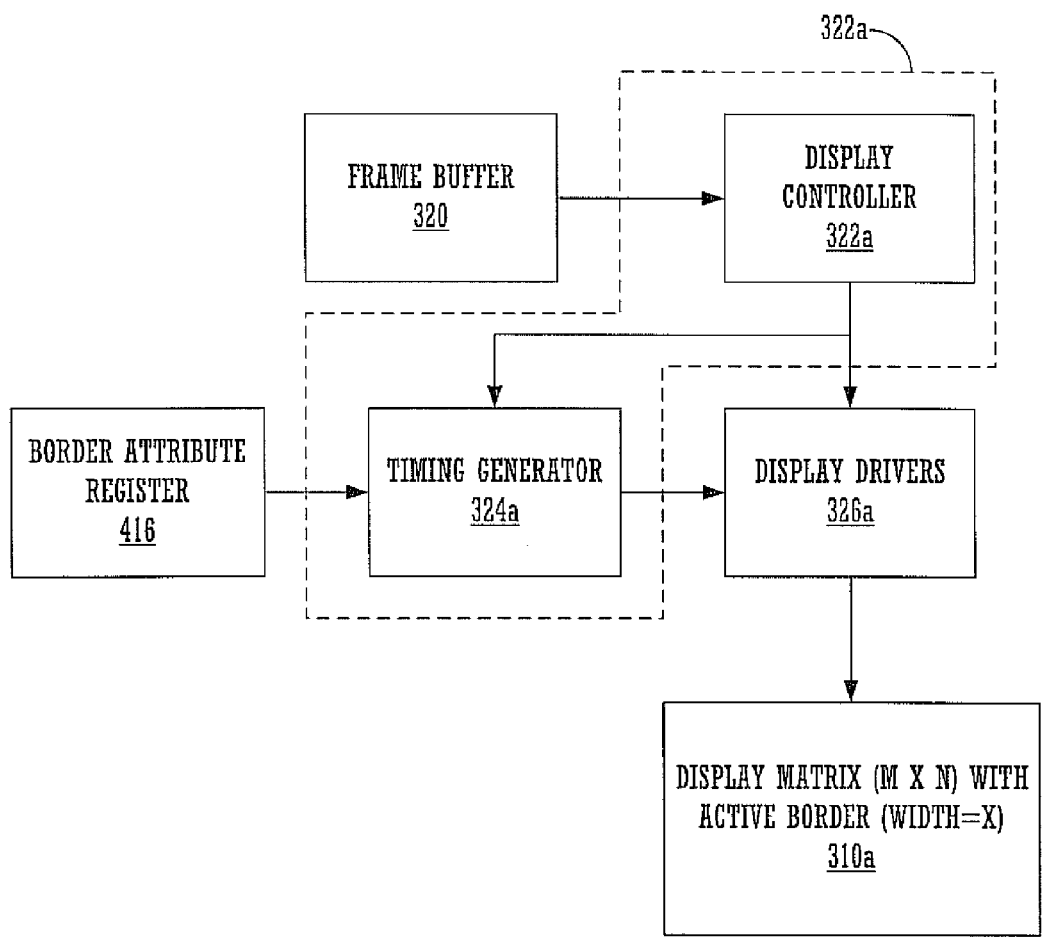
FIG. 15 is a block diagram of the display unit in accordance with the controllable pixel border embodiment of the present invention.

FIG. 15 illustrates a logical diagram of the components of the novel display unit 105a in accordance with the controllable pixel border embodiment of the present invention. Frame buffer memory 320 contains a bitmapped image for display. This frame buffer is read, periodically, by a display controller 322a. The display controller 322a may contain an integrated timing generator 324a. Display controller 322a is either coupled directly to a display driver 326a (e.g., having an internal timing generator) or to an external timing generator 324a. Controller 322a generates certain well known timing signals, such as vertical and horizontal synchronization signals, as well as clocking signals; all required to properly propagate image data into the display drivers 326a. The timing generator 324a is sometimes needed to convert the signals from the controller according to the requirements of the drivers. In addition, the timing generator 324a also generates special signals for placing the data associated with the border region into otherwise invalid vertical and horizontal timing windows for rendering the pixel border.

In this embodiment of the present invention, the timing generator 324a generates the signals required for controlling the pixels of the border region 312a. For this reason, the timing generator 324a is coupled to receive the attribute information of the border attribute register 416. In one embodiment, the attribute information includes color and intensity information. The display drivers 326a are coupled to active transistors within the frame buffer region 314 and the border region 312a of the display matrix 310a. Assuming a frame buffer region of (m×n) pixels and a border width of x, the pixels of the display matrix 310a are (m+2x by n+2x). As such, the display drivers 326a are capable of driving (m+2x by n+2x) numbers of pixels. The display matrix 310a generates images by the modulation of light by discrete pixel elements. The display matrix 310a can be of liquid crystal display (LCD) technology but could also be of any active display technology, such as field emission display (FED) technology or other flat panel display technologies. All the pixels of the display matrix 310a are coupled to display drivers 326a.

Figure 16:
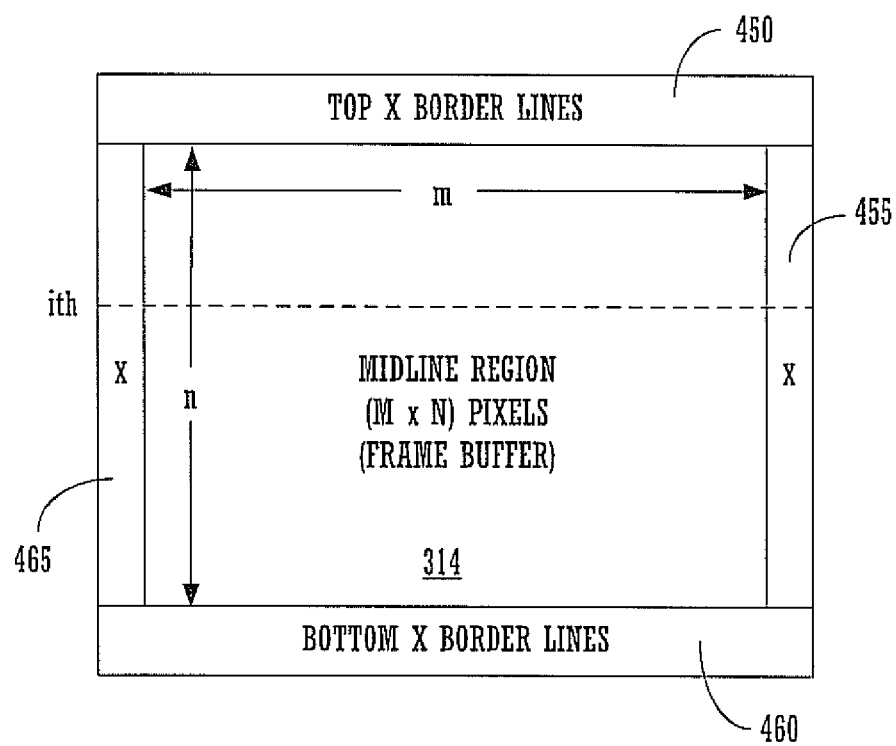
FIG. 16 illustrates the controllable pixel border regions of one embodiment of the present invention, including a top portion, a right and left portion and a bottom portion.

FIG. 16 illustrates a breakdown of the regions of the display matrix 310a in more detail in accordance with this embodiment of the present invention. The display matrix 310a contains the frame buffer region 314 which is surrounded by the pixel border. The pixel border is shown having four regions, a top region 450, a bottom region 460, a left region 465 and a right region 455. The top region 450 contains x lines of pixels. The bottom region 460 contains x lines of pixels. The left and right regions 465 and 455, each contain x columns of pixels. The frame buffer region 314 is also called the midline region and contains m column and n rows of pixels. In accordance with the present invention, while the frame buffer memory 320 of the computer system controls the display of data within region 314, the timing generator 324a, through timing and data signals, controls the display of the border display attribute within the four border regions 450–465.

Figure 17A:
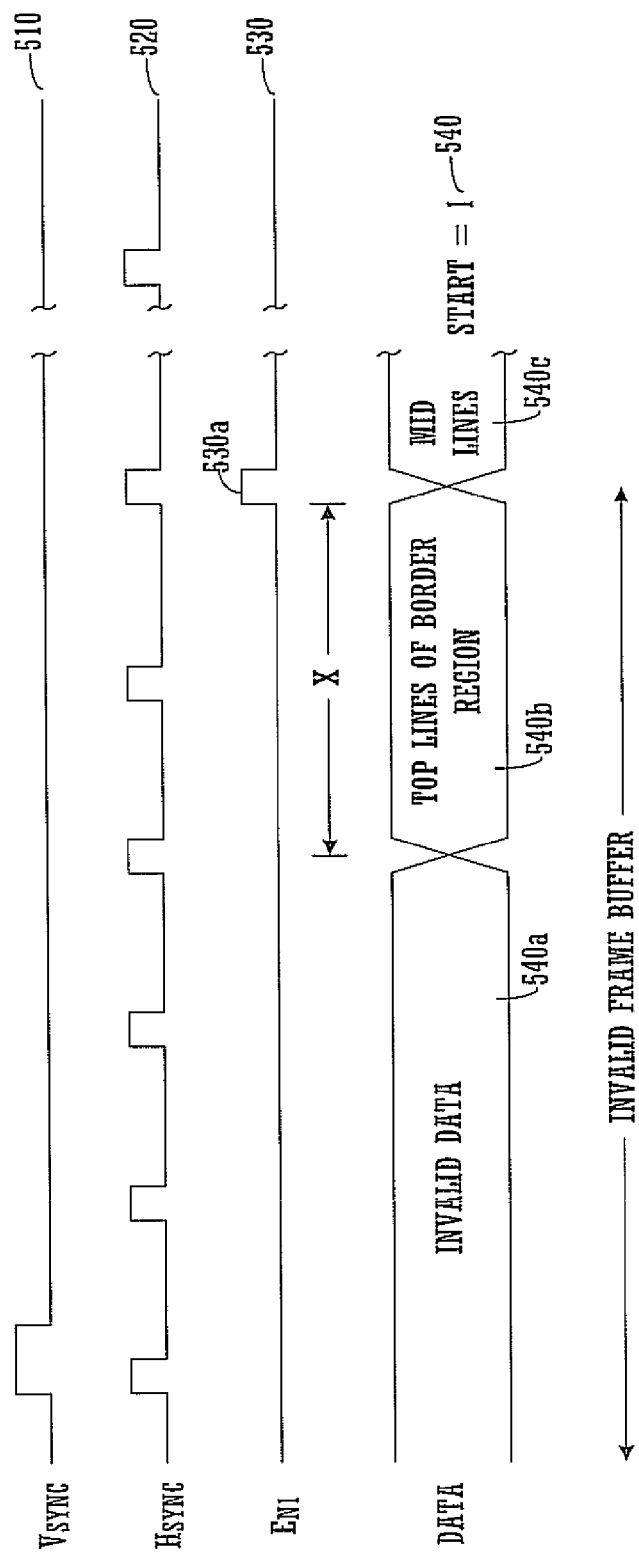
FIG. 17A and FIG. 17B illustrate timing diagrams used by embodiments of the present invention for generating the top and bottom portions of the controllable pixel border within invalid vertical timing windows.
Figure 17B:
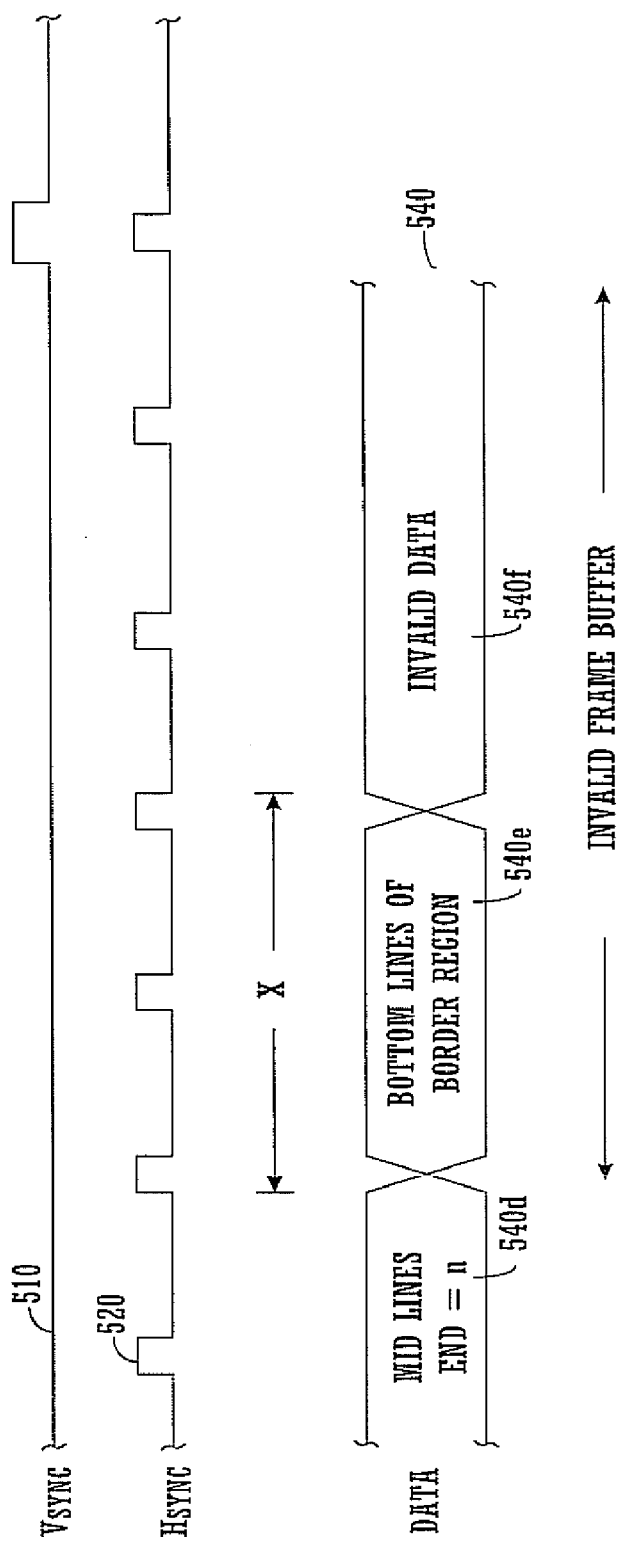
Figure 18:
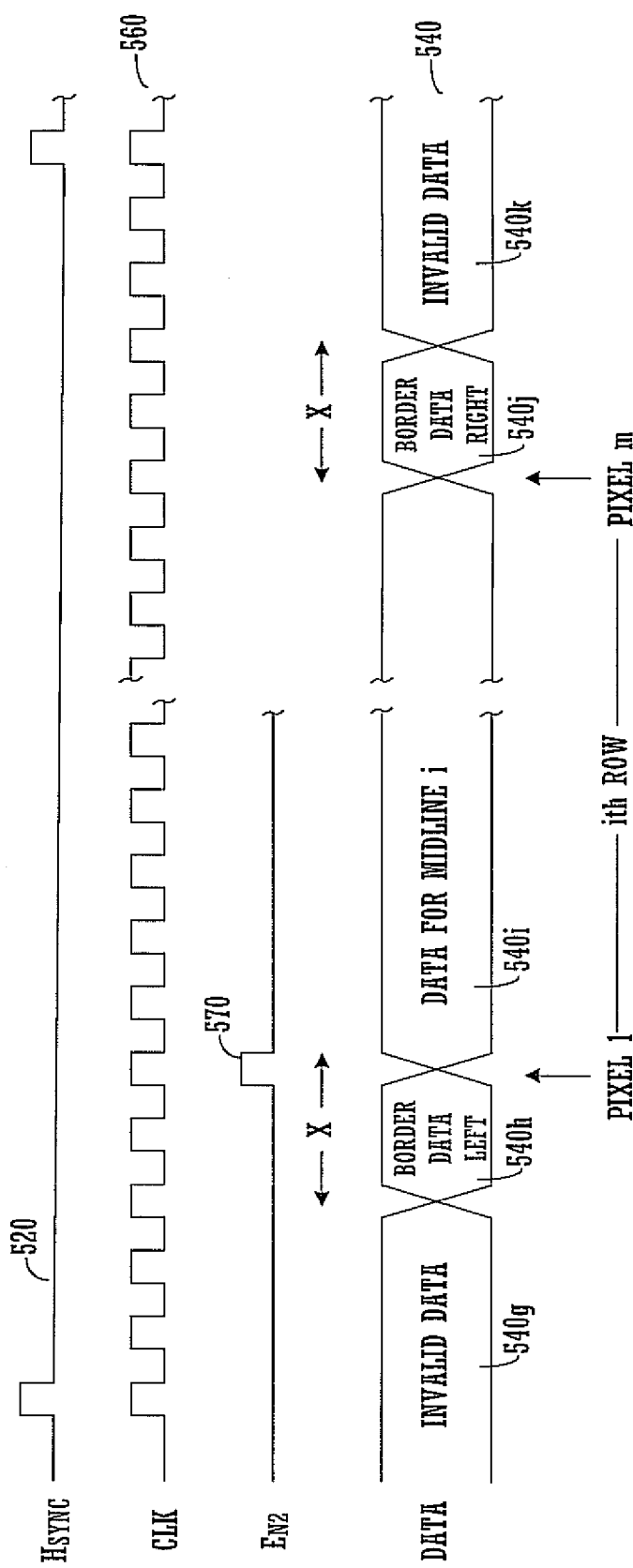
FIG. 18 illustrates a timing diagram used by embodiments of the present invention for generating the right and left portions of the controllable pixel border within invalid horizontal timing windows as well as rendering the lines of the frame buffer region.

FIG. 17A, FIG. 17B and FIG. 18 illustrate timing diagrams of these timing and data signals. For a given frame, the signals are generated in time by FIG. 17A first, followed by a number of FIG. 18 signals then followed by FIG. 17B to complete the frame. As described in more detail below, the present invention takes advantage of certain invalid vertical and horizontal timing windows that are present in conventional video signal formats in order to drive the pixels of the border region. Within these invalid vertical and horizontal timing windows, no frame buffer data is sent. By sending border data during these windows, the present invention is able to render the border pixels without interfering with the conventional rendering processes reserved for the frame buffer region.

FIG. 17A represents the start of the frame. FIG. 17A illustrates timing diagrams of signals generated by the timing generator 324a (or by the controller 322a if combined with the timing generator 324a) for rendering the top x lines of the border region 450. In order to provide an illustration, x is assumed to be two in FIG. 17A, but generally could be assigned to any value. Signal 510 is the vertical synchronization pulse and indicates the start of a new video frame. Signal 520 represents the horizontal synchronization signals and each pulse represents the time at which a new line of the frame may commence rendering. The enable signal line 530 indicates when valid frame data for the frame buffer region 314 commences. Before pulse 530a, the data signal 540 carries invalid data for the frame buffer region 314 as shown by sections 540a and 540b. The vertical, horizontal and enable signal lines 510–530 as described above are well known, conventional timing signals found in many commercial display devices.

The present invention commences sending information for the top border region 450 within a timing window that starts x number of horizontal pulses 520 in advance of the enable pulse 530. In this case x=2. This is shown in data signal section 540b. In section 540b, the data for the top lines of the border region is sent to the display drivers thereby forming the two top lines of the display matrix 310a. It is appreciated that this timing window 540b is otherwise an invalid vertical timing window with respect to the frame buffer region 314. Upon the enable pulse 530a, valid data for the first line of the frame buffer region 314 (e.g., the "mid lines") then commences, as shown by data section 540c. This window 540c represents the data for line 1 which is actually the (x+1)th line of display 310a. Lines 2–n follow. As described in more detail below with respect to FIG. 18, timing window 540c also includes certain invalid horizontal timing windows in which the present invention places the data for the right 455 and left 465 border regions.

FIG. 17B represents the end of the frame. FIG. 17B illustrates timing diagrams of signals generated by the controller 322a (or by the timing generator 324a if separate from the controller 322a) for rendering the bottom x lines (e.g., two lines) of the border region 460. The vertical, horizontal and enable signal lines 510–530 are described above. Data section 540d represents the data for the last line, n, of the frame buffer region 314. This is actually the (x+n)th line of display 310a. In accordance with the present invention, border data is driven for the bottom region 460 within a timing window 540e that completes x number of horizontal pulses 520 after the end of the nth line 540d. Another invalid window 540f follows and continues until the next frame starts (e.g., 40–60 Hz). It is appreciated that both timing windows 540e and 540f are invalid vertical timing windows with respect to the frame buffer region 314. Although not shown in FIG. 17B, an enable line can control the start of the invalid timing windows 540e and 540f.

FIG. 18 illustrates timing diagrams of signals generated by the controller 322a (or by the timing generator 324a if separate from the controller 322a) for rendering the left 465 and right 455 x lines (e.g, two lines) of the border region. FIG. 18 represents the timing for all rows that are not part of the top and bottom border regions. Not only can invalid timing windows exist at the start and end of each frame, e.g., invalid vertical timing windows, but invalid horizontal timing windows can also exist at the start and end of a horizontal line. FIG. 18 illustrates invalid horizontal timing windows 540g–540h and 540j–540k. The horizontal pulses 520 represent the start of a new line. The clock pulses 560 represent the shifting of individual pixel data into the active horizontal video line. At the start of a new line, an enable signal 570 is held low thereby creating an invalid horizontal timing window, e.g., data sections 540g and 540h. Upon pulse 570, data for the active horizontal line, e.g., line i, is shifted into the display 310a and corresponds to the frame buffer region 314 for line i.

In accordance with the present invention, data for the left border region 455 is shifted into the display 310a within an invalid timing window 540h that commences x, e.g., 2, clock cycles 560 before the enable pulse 570. Therefore, the left border region 455 (for line i) is displayed x clock cycles before the start of valid row data. The left border region 455 (for line i) is displayed within an invalid horizontal timing window 540h. The frame buffer portion for line i is represented by data section 540i which commences with pixel 1 and continues through pixel m. In accordance with the present invention, the right border portion 455 for line i commences within an invalid horizontal timing window 540j that ends x number of clock cycles 560 after the end of the valid data window 540i. After that, another invalid horizontal timing window 540k commences and runs until the start of the next horizontal line. It is appreciated that the timing signals represented in FIG. 18 are repeated for each horizontal line (1 to n) of display 310a that runs through the frame buffer region 314.

Therefore, in accordance with the present invention, invalid horizontal and vertical timing windows (with respect to the frame buffer region 314) are used to drive the controllable border pixels with a display attribute of the border attribute register. By so doing, the present invention provides a controllable pixel border region that does not interfere with conventional frame buffer rendering thereby providing a fully backward compatible display 310a that also offers increased contrast for edge located characters for applications that program the border attribute register.

The preferred embodiment of the present invention, a display matrix having a controllable pixel border of active pixels for providing contrast improvement for increased viewability of edge-displayed characters, is thus described. While the present invention has been described in particular embodiments, it should be appreciated that the present invention should not be construed as limited by such embodiments, but rather construed according to the below claims.

What is claimed is:

1. A display unit comprising:
   a display panel comprising a pixel matrix comprising:
      a rectangular pixel frame buffer region; and
      a fixed, active pixel border region comprising pixels permanently dedicated to displaying a border attribute, wherein said fixed, active pixel border region surrounds said rectangular pixel frame buffer region on four sides of said rectangular pixel frame buffer region and comprises a width in the range of two to 128 pixels;
   a frame buffer memory for containing image data for generating an image within said frame buffer region;
   a border attribute register dedicated for containing said border attribute, wherein said border attribute is automatically selected to provide viewing contrast with image data located near said border region, and wherein said border attribute comprises color information for each pixel in said fixed, active pixel border region, and wherein said border attribute is equal to a background attribute currently being displayed; and
   a display controller coupled to said frame buffer memory, coupled to receive said border attribute from said border attribute register, and coupled to control said display panel, said display controller for generating a first set of signals for rendering said image within said frame buffer region and for generating a second set of signals for displaying said border attribute within said fixed, active border region.

2. The display unit as described in claim 1 wherein said second set of signals are generated within invalid timing windows with respect to said frame buffer region.

3. The display unit as described in claim 1 wherein a first portion of said second set of signals are generated in an invalid horizontal timing window that commences x clock cycles before valid data for said frame buffer region commences and wherein a second portion of said second set of signals are generated in an invalid horizontal timing window that ends x clock cycles after valid data for said frame buffer region completes.

4. The display unit as described in claim 3 wherein a third portion of said second set of signals are generated in an invalid vertical timing window that commences x horizontal pulses before a first valid horizontal line commences of a frame and wherein a fourth portion of said second set of signals are generated in an invalid vertical timing window that ends x horizontal pulses after the end of the last valid horizontal line of said frame.

5. The display unit as described in claim 1, wherein said border attribute of said border region comprises a color attribute.

6. The display unit as described in claim 1 wherein said display panel is a thin film transistor liquid crystal display panel.

7. The display unit as described in claim 1 wherein said frame buffer region comprises 160 rows and 160 columns of pixels.

8. The display unit as described in claim 1 further comprising a background display attribute register and wherein, by default, said border attribute register is equal to said background attribute register.

9. A display unit comprising:
a display panel comprising a pixel matrix comprising: a rectangular pixel frame buffer region; and a fixed, active pixel border region comprising pixels permanently dedicated to displaying a border attribute, wherein said fixed, active pixel border region surrounds said rectangular pixel frame buffer region on four sides of said rectangular pixel frame buffer region including top, bottom, right and left border regions, wherein said fixed, active pixel border region comprises a width in the range of two to ten pixels;
a frame buffer memory for containing character data for generating character images within said frame buffer region;
a border attribute register dedicated for containing said border attribute for said border region, wherein said border attribute is automatically selected to provide viewing contrast with character images located near said border region, and wherein said border attribute comprises color information for each pixel in said fixed, active pixel border region, and wherein said border attribute is equal to a background attribute; and
a display controller coupled to said frame buffer memory, coupled to receive said border attribute of said border attribute register, and coupled to control said display panel, said display controller for generating a first set of signals for rendering said character images within said rectangular pixel frame buffer region wherein said first set of signals comprises vertical and horizontal invalid timing windows and wherein said display controller is also for generating a second set of signals for displaying said border attribute within said fixed, active pixel border region.

10. The display unit as described in claim 9 wherein said second set of signals are generated within said vertical and horizontal invalid timing windows.

11. The display unit as described in claim 9 wherein said top and bottom border regions are rendered during said vertical invalid timing windows and wherein said right and left border regions are rendered during said horizontal invalid timing windows.

12. The display unit as described in claim 9 wherein said display attribute comprises a color attribute.

13. The display unit as described in claim 9 wherein said display panel is a thin film transistor liquid crystal display panel.

14. The display unit as described in claim 9 wherein said frame buffer region comprises 160 rows and 160 columns of pixels.

15. The display unit as described in claim 9 further comprising a background display attribute register and wherein, by default, said border attribute register is equal to said background attribute register.

16. A handheld device comprising:
a processor;
a memory unit coupled to said processor; and
a display unit coupled to said processor and comprising:
a display panel comprising a pixel matrix comprising: a rectangular pixel frame buffer region; and a fixed, active pixel border region comprising pixels permanently dedicated to displaying a border attribute, wherein said fixed, active pixel border region surrounds said rectangular pixel frame buffer region on four sides of said rectangular pixel frame buffer region and comprises a width in the range of two to five pixels;
a frame buffer memory for containing image data for generating an image within said rectangular pixel frame buffer region;
a border attribute register dedicated for containing said border attribute for said fixed, active border region, wherein said border attribute is automatically selected to provide viewing contrast with image data located near said fixed, active border region, and wherein said border attribute comprises color information, and wherein said border attribute is equal to a background attribute currently being displayed; and
a display controller coupled to said frame buffer memory, coupled to receive said border attribute from said border attribute register, and coupled to control said display panel, said display controller for generating a first set of signals for rendering said image within said rectangular pixel frame buffer region and for generating a second set of signals for displaying said border attribute within said fixed, active border region.

17. The handheld device as described in claim 16 wherein said second set of signals are generated within video timing windows that contain invalid data with respect to said frame buffer region.

18. The handheld device as described in claim 16 wherein a first portion of said second set of signals are generated x clock cycles before valid data for said frame buffer region commences and wherein a second portion of said second set of signals are generated x clock cycles after valid data for said frame buffer region completes.

19. The handheld device as described in claim 16 wherein said display attribute comprises a color attribute.

20. The handheld device as described in claim 16 wherein said display panel is a thin film transistor liquid crystal display panel.

21. The handheld device as described in claim 16 further comprising a background display attribute register and wherein, by default, said border attribute register is equal to said background attribute register.

* * * * *